(12) United States Patent
Ho et al.

(10) Patent No.: US 8,942,018 B2
(45) Date of Patent: *Jan. 27, 2015

(54) SINGLE-PHASE SELF-DRIVEN FULL-BRIDGE SYNCHRONOUS RECTIFICATION

(75) Inventors: Wing Choi Ho, Yuen Long (HK); Ron Shu Yuen Hui, Shatin (HK); Xun Liu, Ma On Shan (HK)

(73) Assignee: ConvenientPower HK Ltd., Central (HK)

( * ) Notice: Subject to any disclaimer, the term of this patent is extended or adjusted under 35 U.S.C. 154(b) by 451 days.

This patent is subject to a terminal disclaimer.

(21) Appl. No.: 12/194,921

(22) Filed: Aug. 20, 2008

(65) Prior Publication Data

US 2010/0046259 A1 Feb. 25, 2010

(51) Int. Cl.
*H02M 7/06* (2006.01)
*H02M 7/217* (2006.01)
*H02M 7/219* (2006.01)

(52) U.S. Cl.
CPC ...... *H02M 7/217* (2013.01); *H02M 2007/2195* (2013.01); *Y02B 70/1408* (2013.01)
USPC .......................................... 363/126; 363/127

(58) Field of Classification Search
USPC ....................... 363/21.06, 125–127
See application file for complete search history.

(56) References Cited

U.S. PATENT DOCUMENTS

| 4,412,277 | A | 10/1983 | Mitchell |
| 4,473,757 | A | 9/1984 | Farago et al. |
| 5,625,541 | A | 4/1997 | Rozman |
| 5,872,705 | A | 2/1999 | Loftus, Jr. et al. |
| 6,002,597 | A | 12/1999 | Rozman |
| 6,011,703 | A | 1/2000 | Boylan et al. |
| 6,038,148 | A | 3/2000 | Farrington et al. |
| 6,069,799 | A | 5/2000 | Bowman et al. |
| 6,084,792 | A | 7/2000 | Chen et al. |
| 6,240,318 | B1 | 5/2001 | Phillips |
| 6,288,920 | B1 | 9/2001 | Jacobs et al. |
| 6,301,139 | B1 | 10/2001 | Patel |
| 6,353,544 | B1 * | 3/2002 | Lau ............................ 363/21.12 |
| 6,353,644 | B1 | 3/2002 | Cai et al. |

(Continued)

FOREIGN PATENT DOCUMENTS

| CN | 1277750 A | 12/2000 |
| CN | 1380739 A | 11/2002 |

(Continued)

OTHER PUBLICATIONS

Davide Giacomini, A Novel Efficient Approach to Input Bridges, May 2008, International Rectifier, PCIM Europe, pp. 1-7.*

(Continued)

*Primary Examiner* — Jue Zhang
(74) *Attorney, Agent, or Firm* — Fenwick & West LLP

(57) ABSTRACT

A full-bridge rectifier is configured to provide synchronous rectification with either a current-source or a voltage-source. The rectifier has an upper branch and a lower branch and two current loops, with each of the branches including voltage- or current-controlled active switches, diodes or combinations thereof that are selected such that each loop includes one active switch or diode from the upper branch and one active switch or diode from the lower branch, and each current loop comprises at least one diode or current-controlled active switch, and at least one voltage- or current-controlled active switch is included in one of the upper or lower branches.

3 Claims, 27 Drawing Sheets

(56) References Cited

U.S. PATENT DOCUMENTS

| | | | |
|---|---|---|---|
| 6,366,485 B1 | 4/2002 | Fujisawa | |
| 6,563,719 B1 | 5/2003 | Hua et al. | |
| 6,583,993 B2 | 6/2003 | Hua | |
| 6,859,372 B2 | 2/2005 | Xu et al. | |
| 7,269,038 B2 | 9/2007 | Shekhawat et al. | |
| 2002/0021577 A1* | 2/2002 | Lau | 363/125 |
| 2003/0095423 A1 | 5/2003 | Hirst | |
| 2006/0062032 A1 | 3/2006 | Soldano | |
| 2007/0029965 A1 | 2/2007 | Hui | |
| 2007/0058402 A1 | 3/2007 | Shekhawat et al. | |
| 2007/0152795 A1* | 7/2007 | Zeng et al. | 336/212 |
| 2008/0144339 A1 | 6/2008 | Hsieh et al. | |

FOREIGN PATENT DOCUMENTS

| | | | |
|---|---|---|---|
| CN | 1617435 A | 5/2005 | |
| CN | 101040425 A | 9/2007 | |
| CN | 101056068 A | 10/2007 | |
| CN | 101154891 A | 4/2008 | |
| EP | 1056190 A1 | 11/2000 | |
| FR | 2900292 A1 | 10/2007 | |
| WO | WO 96/01003 A1 | 1/1996 | |
| WO | WO 2010/020182 A1 | 2/2010 | |

OTHER PUBLICATIONS

Hiura et al., A Synchronous Rectification Using a Digital PLL Technique for Contactless Power Supplies, Oct. 2005, IEEE, vol. 41, No. 10, pp. 3997-3999.* de Souza et al., "High Power Factor Rectifier with Reduced Conduction and Commutation Losses", Power Electronics Institute, IEEE Xplore, vol. 8-1 (1999).

Liu et al., "Evaluation of Power Losses in Different CCM Mode Single-Phase Boost PFC Converters Via a Simulation Tool", Center for Power Electronics Systems, Virginia Polytechnic Institute & State University, IEEE Xplore (2001).

Salmon, John C., Ph.D., "Circuit Topologies for PWM Boost Rectifiers Operated from 1-Phase and 3-Phase AC Supplies and Using Either Single or Split DC Rail Voltage Outputs", Department of Electrical Engineering, University of Alberta, Canada, IEEE Xplore (1995).

Huber et al., "Performance Evaluation of Bridgeless PFC Boost Rectifiers", IEEE Transactions on Power Electronics, vol. 23, No. 3 (May 2008).

M.I. Mihaiu, "Toward the 'Ideal Diode' Using Power MOSFET in Full Wave Synchronous Rectifiers for Low Voltage Power Supplies", IEEE Transactions, 978-I-4244-1664 (Jun. 2008).

Blanc, J., "Practical Application of MOSFET Synchronous Rectifiers", Telecommunications Energy Conference, INTELEC'91 (Nov. 1991).

Blake et al., "Synchronous Rectifiers Versus Schottky Diodes: A Comparison of the Losses of a Synchronous Rectifier Versus the Losses of a Schottky Diode Rectifier", IEEE Applied Power Electronics Conference (APEC), 1994.

Xie et al., "A Novel High Frequency Current-Driven Synchronous Rectifier Applicable to Most Switching Topologies", IEEE Transactions on Power Electronics, vol. 16, No. 5 (Sep. 2001).

Murakami et al., "A Simple and Efficient Synchronous Rectifier for Forward DC-DC Converters", Applied Power Electronics Conference and Exposition (1993).

Alou et al., "A New Driving Scheme for Synchronous Rectifiers: Single Winding Self-Driven Synchronous Rectification", IEEE Transactions on Power Electronics, vol. 16, No. 6 (Nov. 2001).

Fernandez et al., "New Self-Driven Synchronous Rectification System for Converters with a Symmetrically Driven Transformer", IEEE Transactions on Industry Applications, vol. 41, No. 5 (Sep./Oct. 2005).

Chiu, Huang-Jen, "A High-Efficiency Soft-Switched AC/DC Converter with Current-Doubler Synchronous Rectification", IEEE Transactions on Industrial Electronics, vol. 52, No. 3 (Jun. 2005).

Tabisz et al., "A MOSFET Resonant Synchronous Rectifier for High-Frequency DC/DC Converters", Power Electronics Specialists Conference (PESC'90), 1990.

Jovanovic et al., "Evaluation of Synchronous-Rectification Efficiency Improvement Limits in Forward Converters", IEEE Transactions on Industrial Electronics, vol. 42, No. 4 (Aug. 1995).

Zhang et al., "Design Considerations and Performance Evaluations of Synchronous Rectification in Flyback Converters", IEEE Transactions on Power Electronics, vol. 13, No. 3 (May 1998).

Panov et al., "Design and Performance Evaluation of Low-Voltage/High-Current DC/DC On-Board Modules", IEEE Transactions on Power Electronics, vol. 16, No. 1 (Jan. 2001).

Qian et al., "Self-Driven Synchronous Rectification Scheme Without Undesired Gate-Voltage Discharge for DC-DC Converters with Symmetrically Driven Transformers", IEEE Transactions on Power Electronics, vol. 23, No. 1 (Jan. 2008).

Miura et al., "A Synchronous Rectification Using a Digital PLL Technique for Contactless Power Supplies", IEEE Transactions on Magnetics, vol. 41, No. 10 (Oct. 2005).

European Extended Search Report, European Application No. 09807881.9, Apr. 12, 2013, 9 pages.

Giacomini, D., "A Novel Efficient Approach to Input Bridges," International Rectifier, PCIM Europe, May 27-29, 2008, pp. 1-7.

PCT International Search Report, PCT Application No. PCT/CN2009/073349, Nov. 26, 2009, 3 pages.

PCT International Written Opinion, PCT Application No. PCT/CN2009/073349, Nov. 26, 2009, 3 pages.

PCT International Search Report, PCT Application No. PCT/CN2009/073355, Nov. 26, 2009, 3 pages.

PCT International Written Opinion, PCT Application No. PCT/CN2009/073355, Nov. 26, 2009, 4 pages.

United States Office Action, U.S. Appl. No. 12/274,469, Mar. 6, 2012, 7 pages.

United States Office Action, U.S. Appl. No. 12/274,469, Jun. 15, 2012, 14 pages.

United States Office Action, U.S. Appl. No. 12/274,469, Dec. 12, 2012, 18 pages.

Chinese Office Action, Chinese Application No. 200980132255.0, Jan. 21, 2013, 19 pages.

United States Office Action, U.S. Appl. No. 12/274,469, Mar. 29, 2013, 14 pages.

Chinese Second Office Action, Chinese Application No. 200980132098.3, Feb. 7, 2014, 11 pages.

Chinese Third Office Action, Chinese Application No. 200980132098.3, Jun. 10, 2014, 18 pages.

European Examination Report, European Application No. 09807881.9, Dec. 5, 2013, 5 pages.

Miura, H. et al., "A Synchronous Rectification Using a Digital PLL Technique for Contactless Power Supplys," IEEE Transactions on Magnetics, Oct. 31, 2005, p. 115, vol. 41, No. 10.

Chinese Fourth Office Action, Chinese Application No. 200980132255.0, Sep. 10, 2014, 14 pages.

Chinese Fourth Office Action, Chinese Application No. 200980132098.3, Nov. 15, 2014, 6 pages.

* cited by examiner

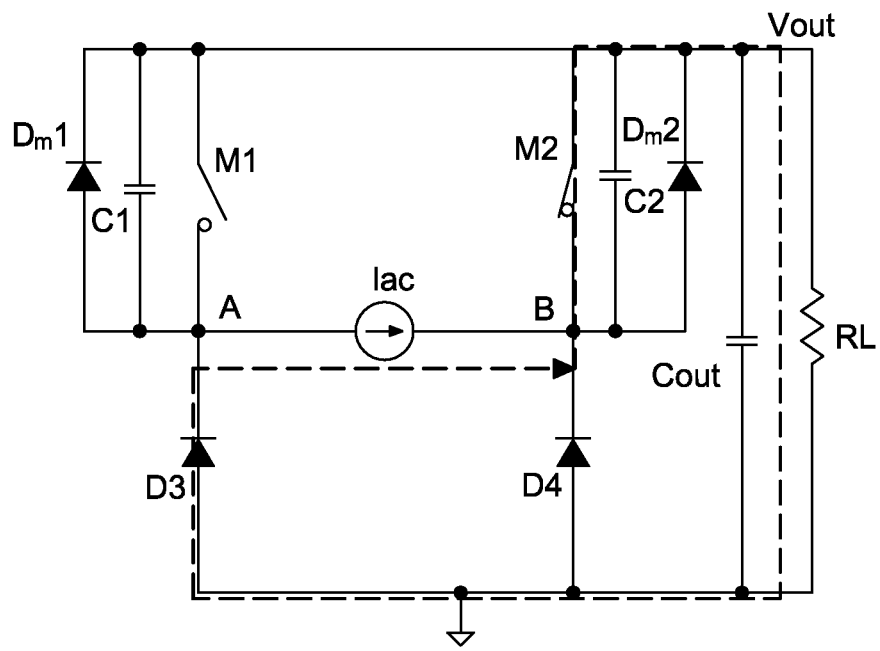
FIG. 6(a)  t0 < t < t1
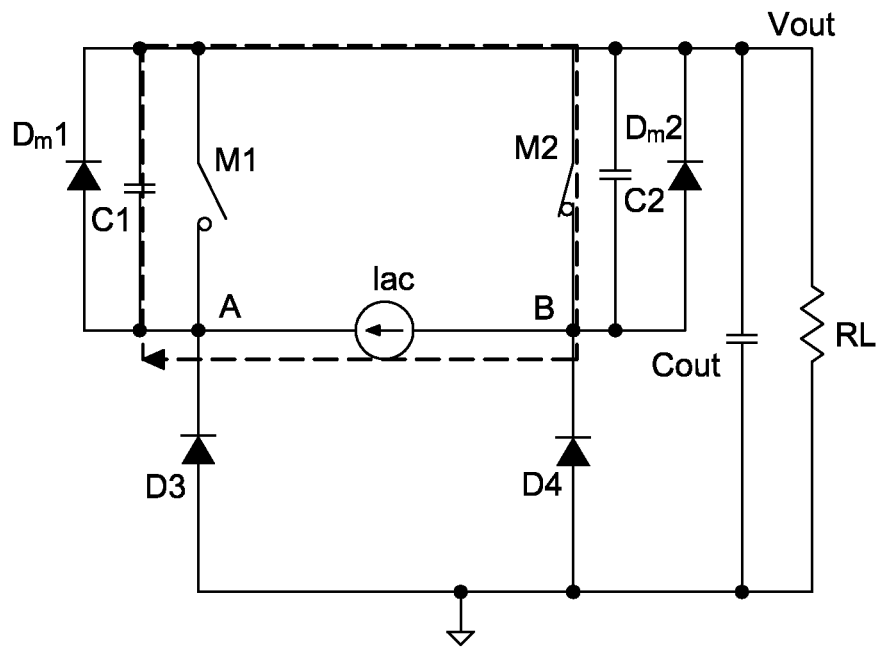
FIG. 6(b)  t1 < t < t2

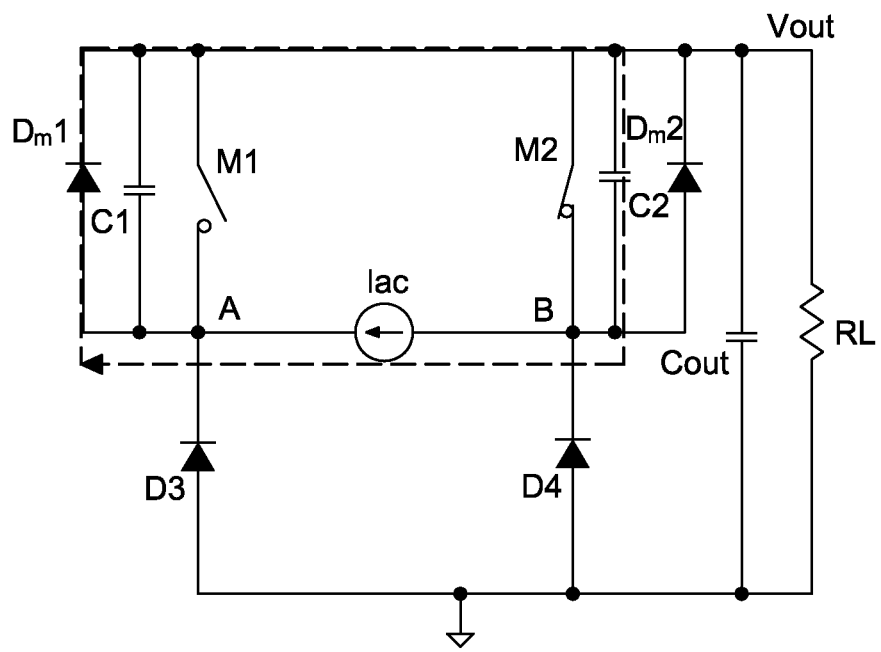
FIG. 6(c)  t2 < t < t3
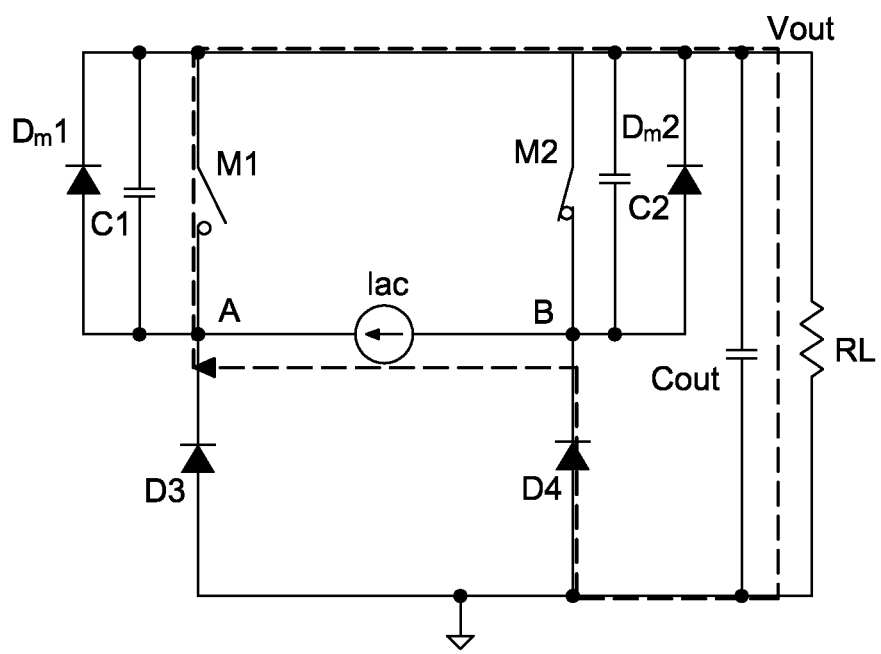
FIG. 6(d)  t3 < t < t4

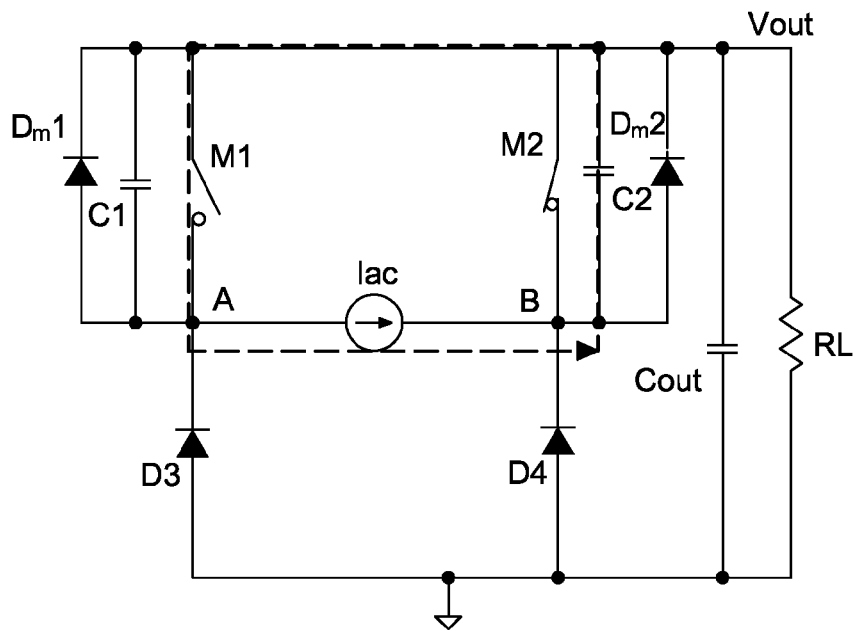
FIG. 6(e)  t4 < t < t5
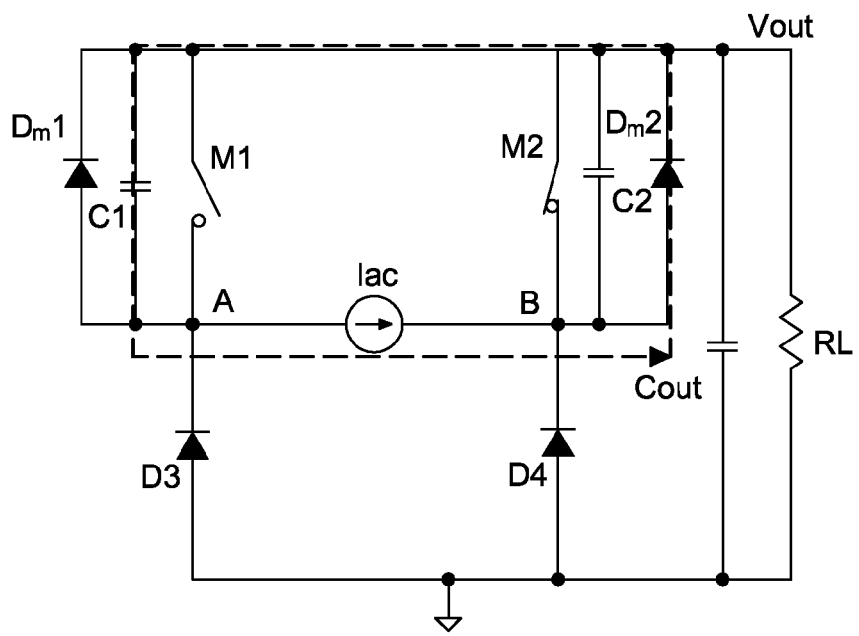
FIG. 6(f)  t5 < t < t6

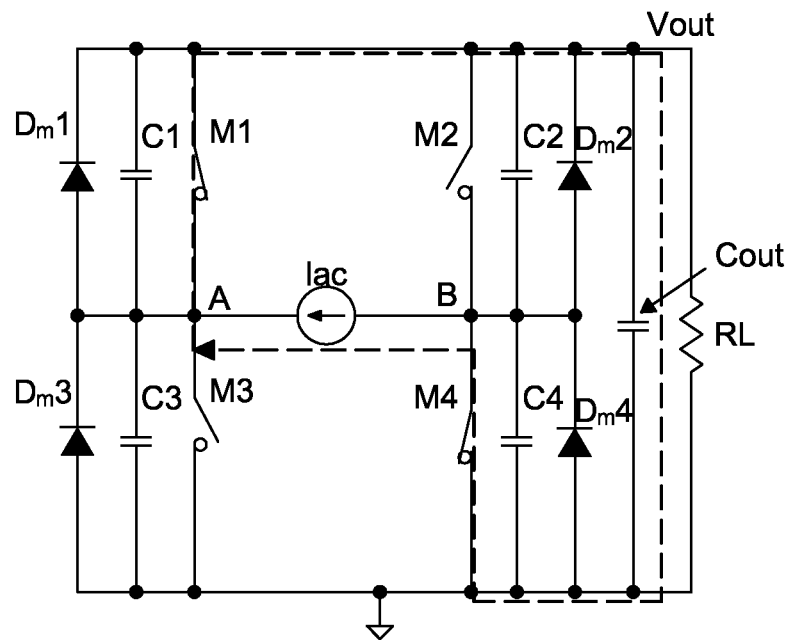
FIG. 10(a)  t0 < t < t1
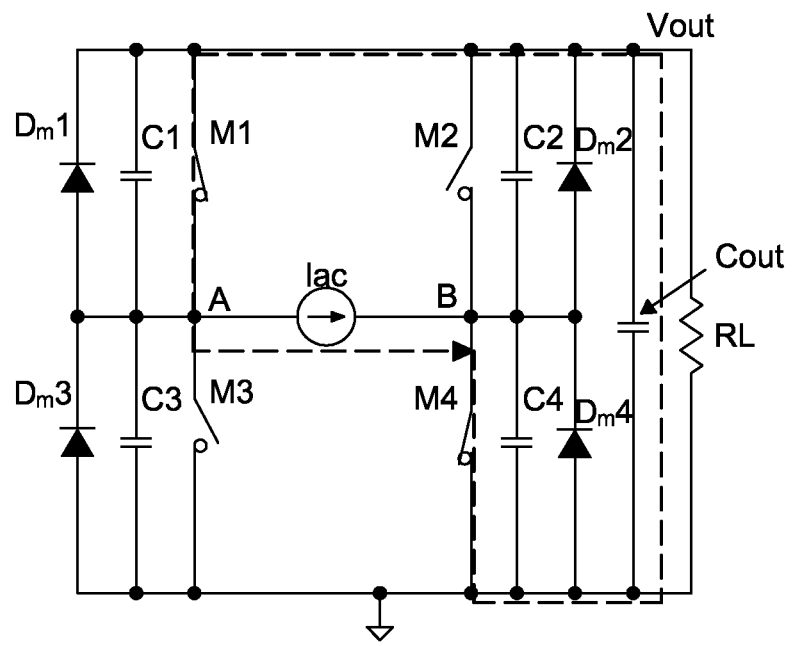
FIG. 10(b)  t1 < t < t2

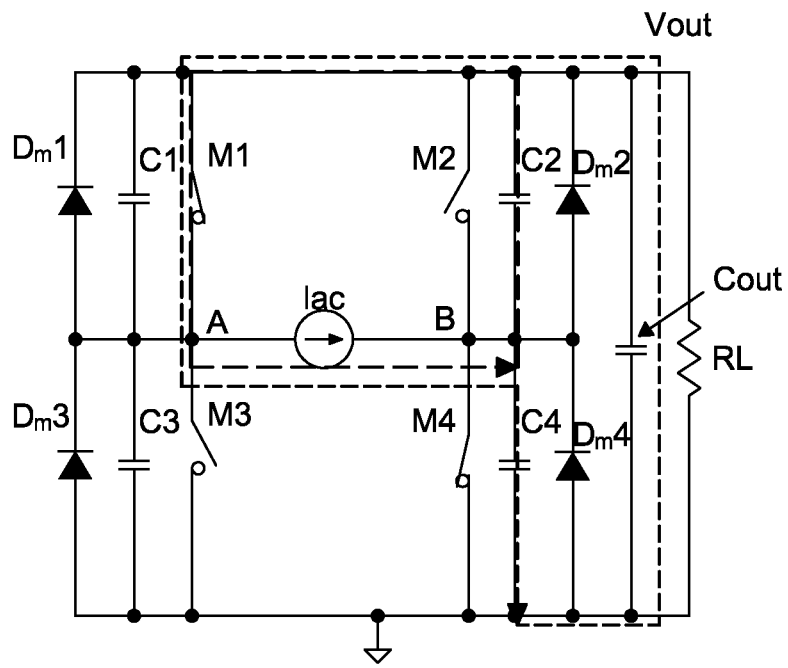
FIG. 10(c)  t2 < t < t3
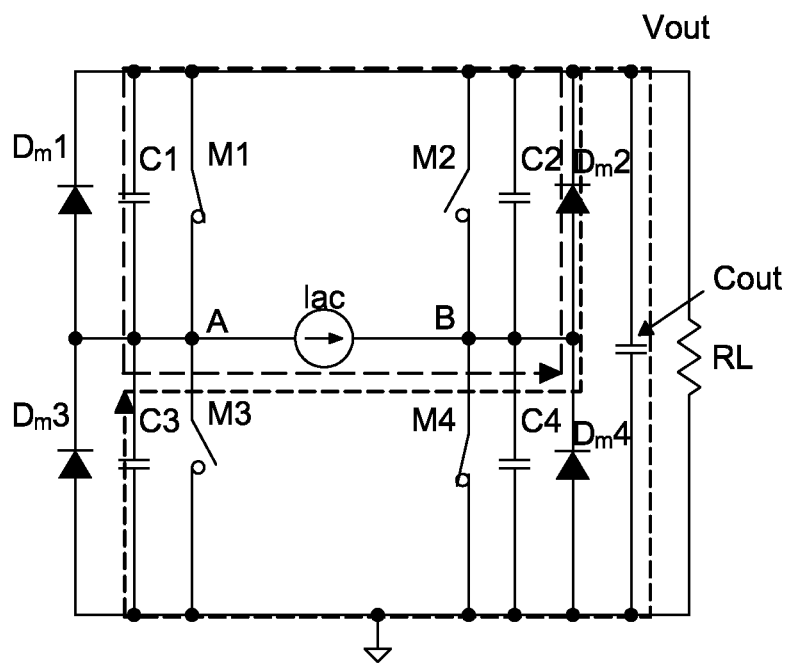
FIG. 10(d)  t3 < t < t4

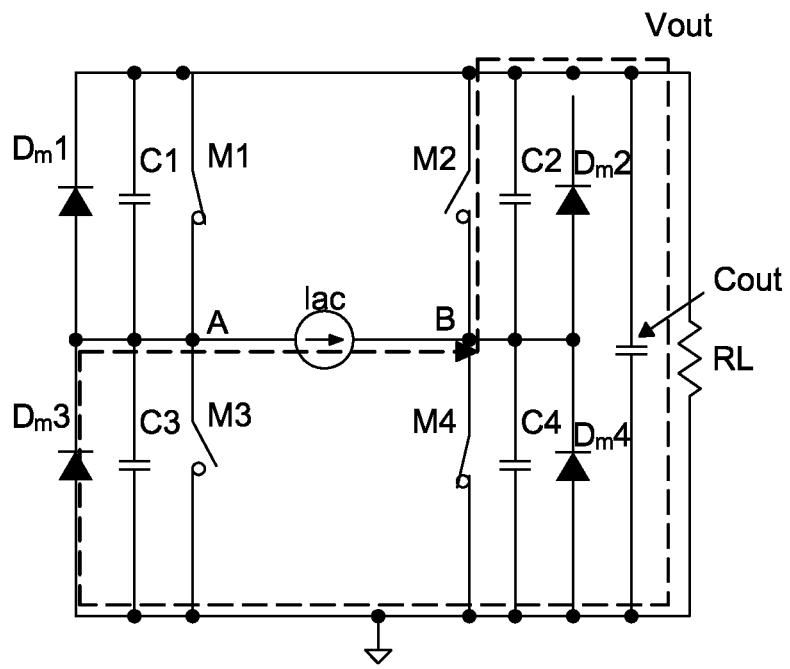
FIG. 10(e)  t4 < t < t5
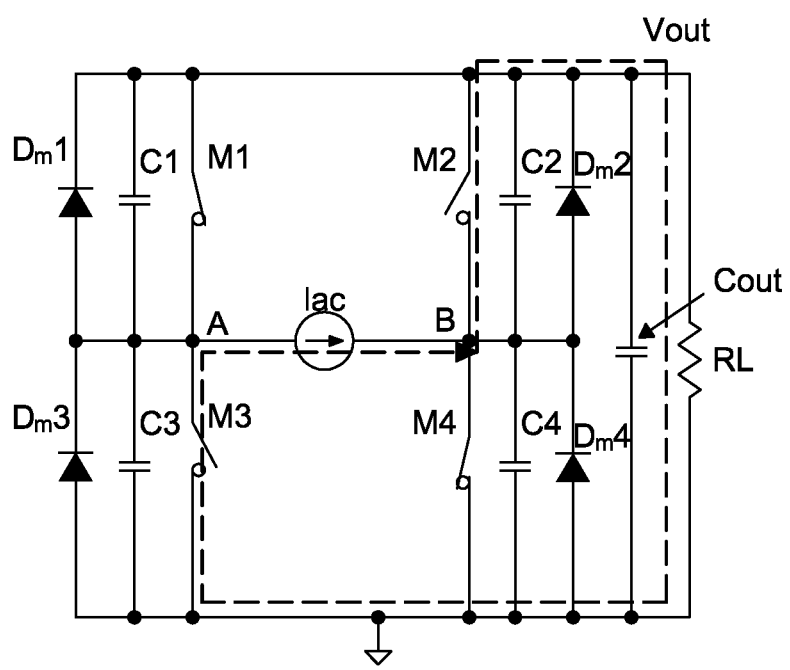
FIG. 10(f)  t5 < t < t6

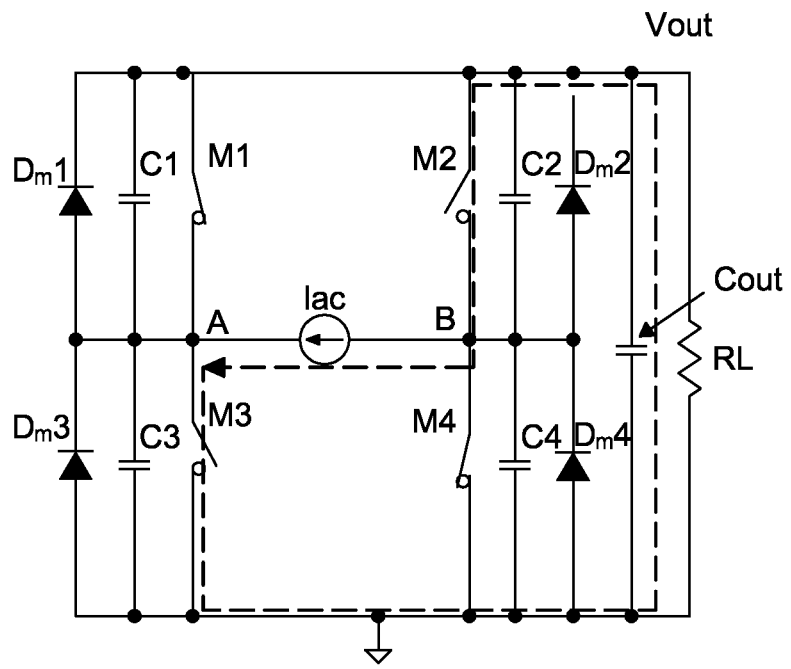
FIG. 10(g)  t6 < t < t7
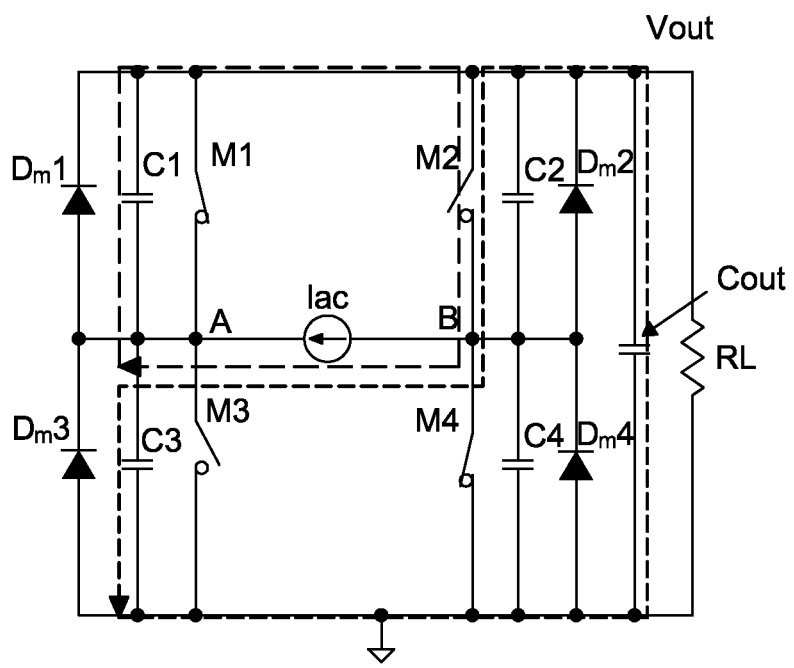
FIG. 10(h)  t7 < t < t8

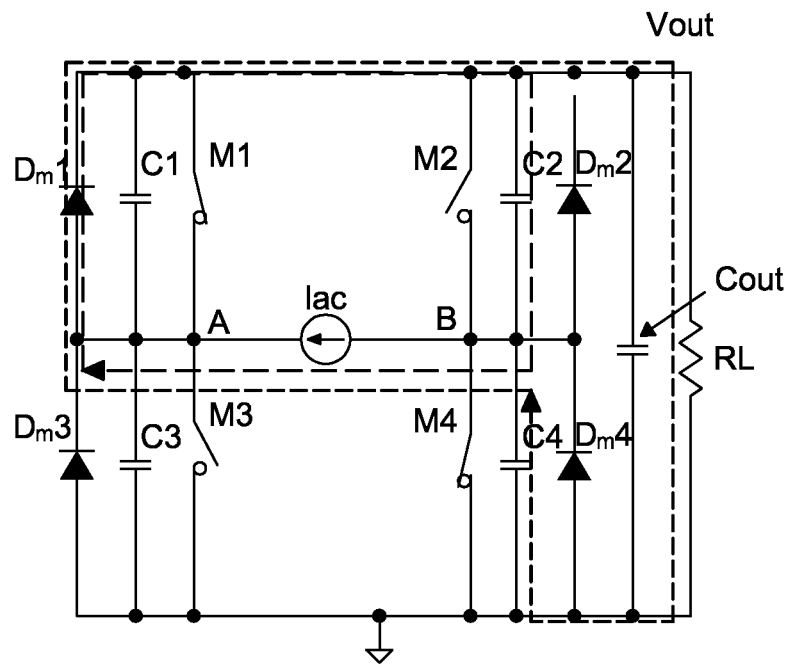
FIG. 10(i)  t8 < t < t9
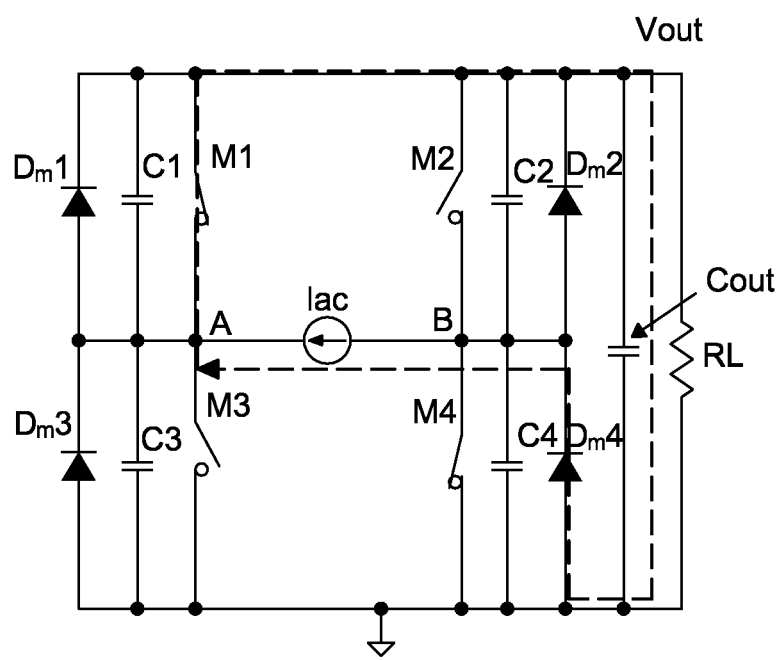
FIG. 10(j)  t9 < t < t10

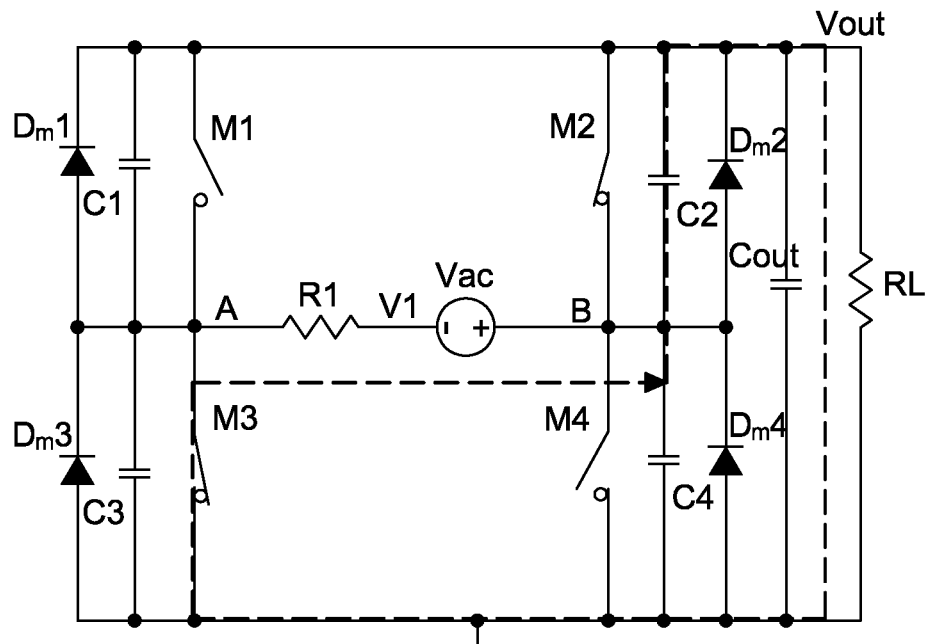
FIG. 14(a)  t0 < t < t1
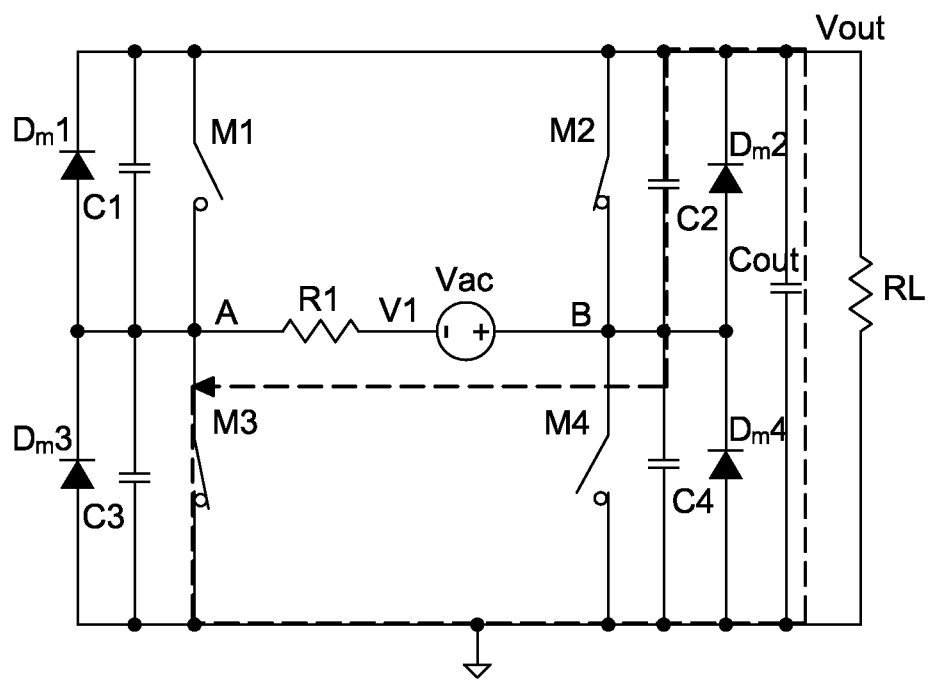
FIG. 14(b)  t1 < t < t2

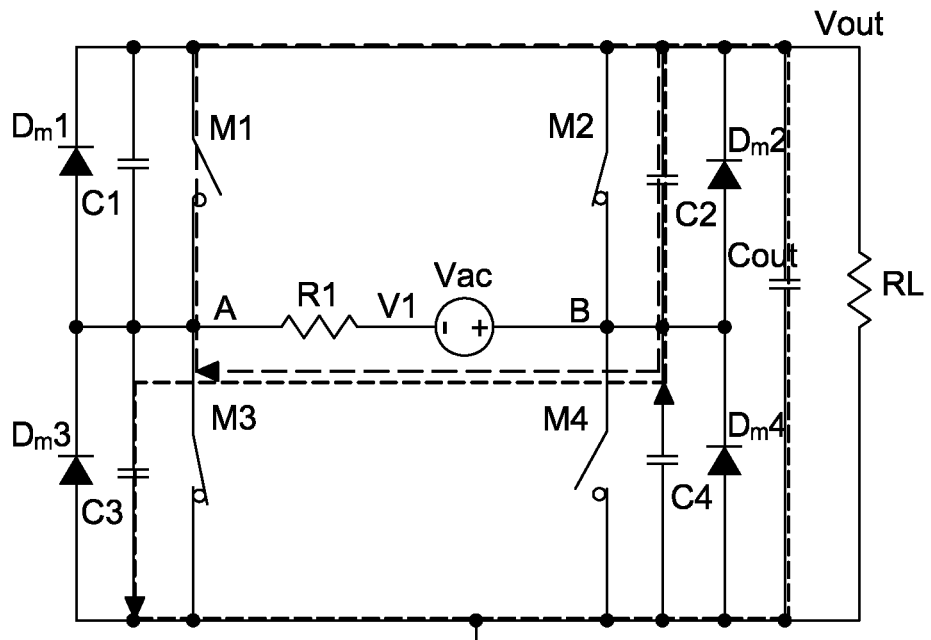
FIG. 14(c)  t2 < t < t3
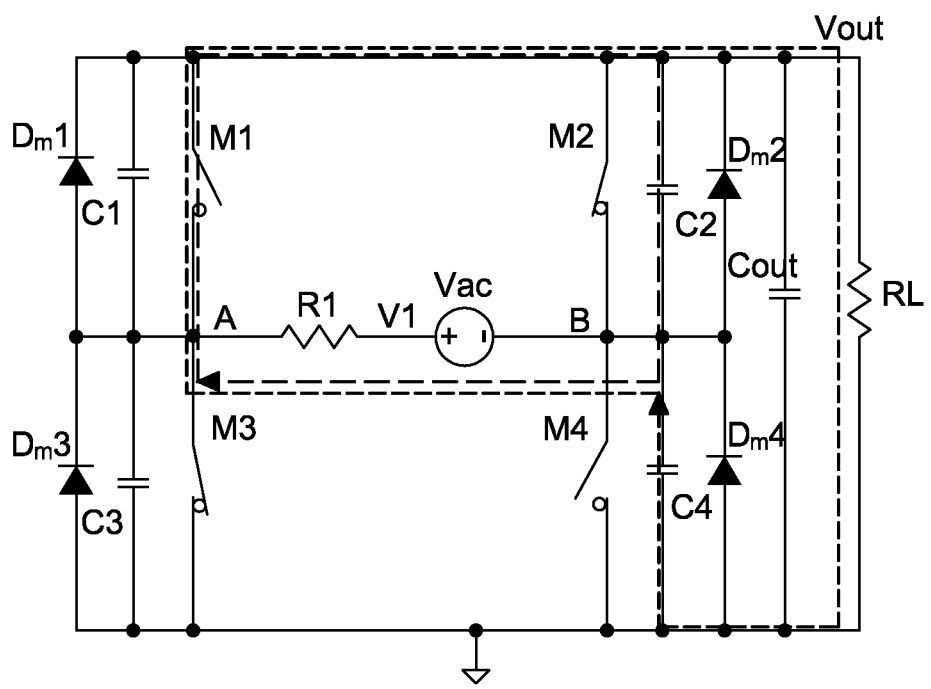
FIG. 14(d)  t3 < t < t4

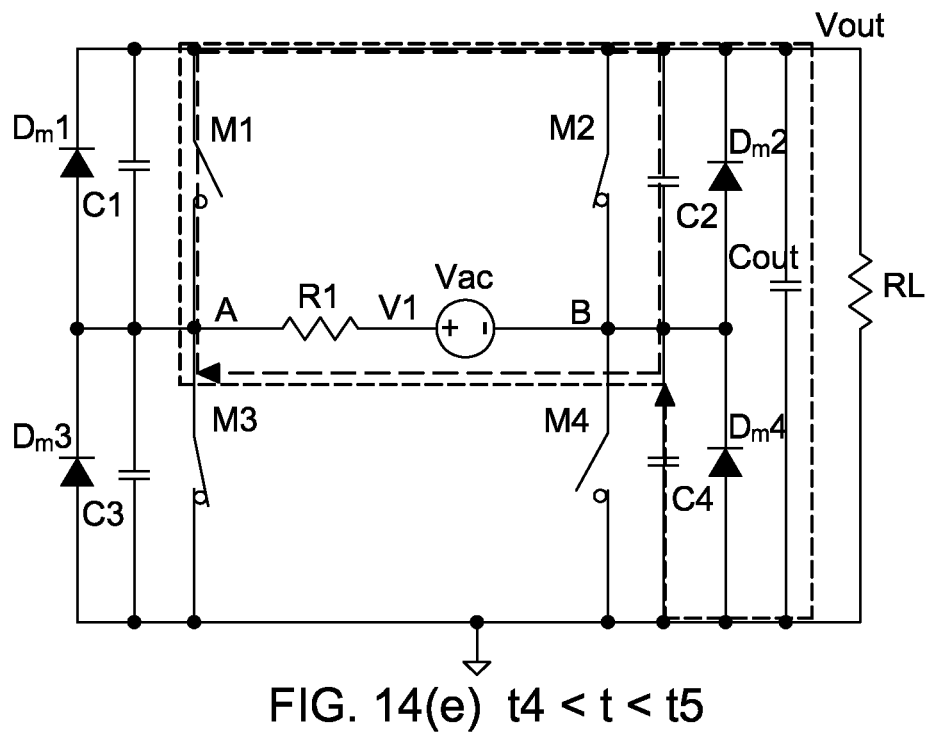
FIG. 14(e)  t4 < t < t5
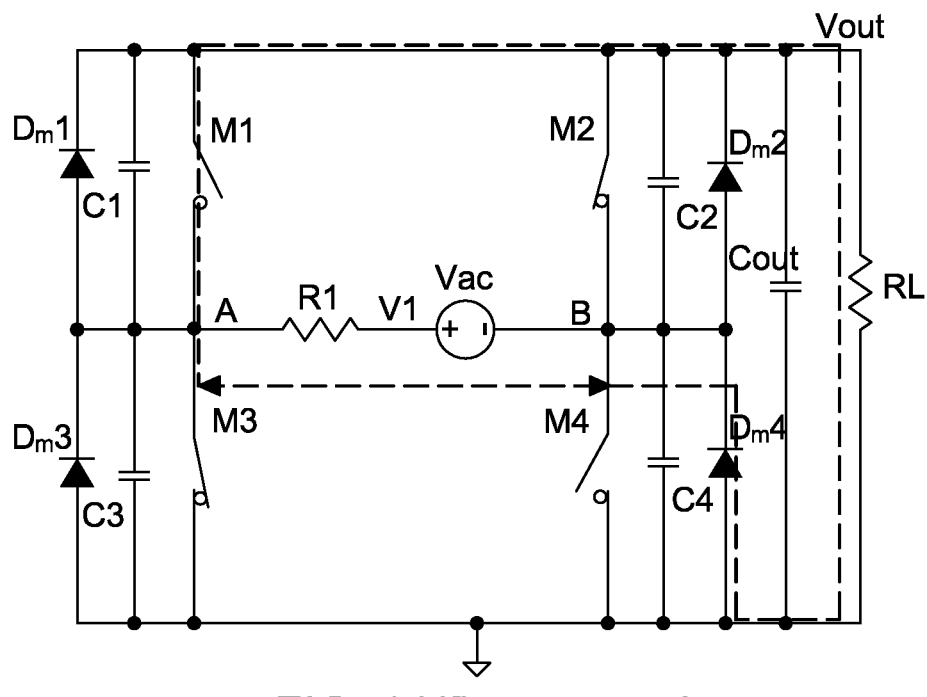
FIG. 14(f)  t5 < t < t6

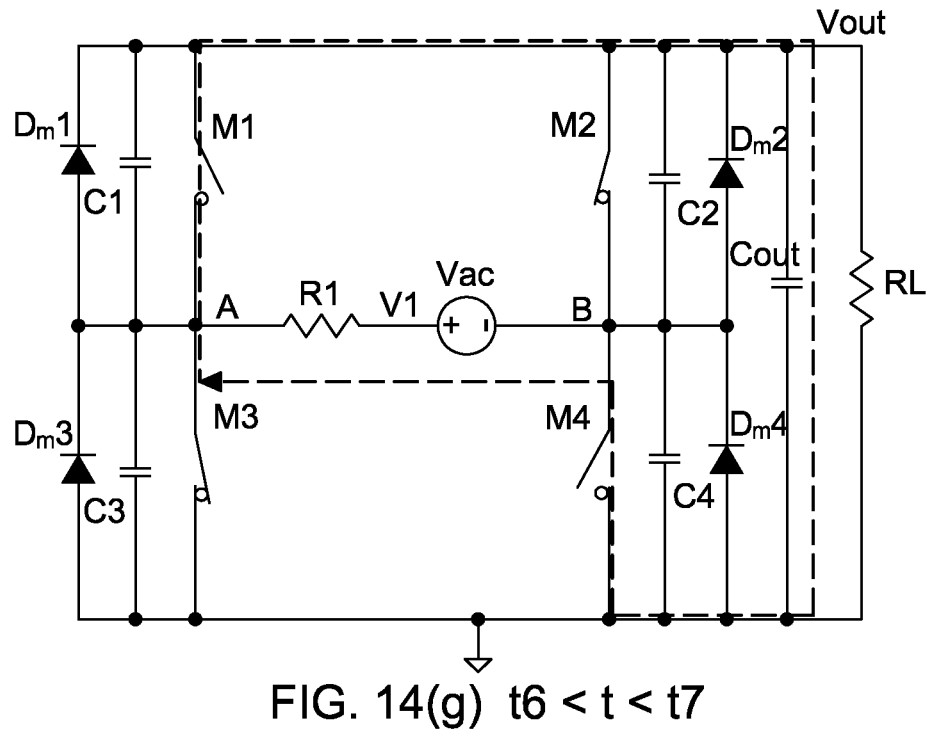
FIG. 14(g)  t6 < t < t7
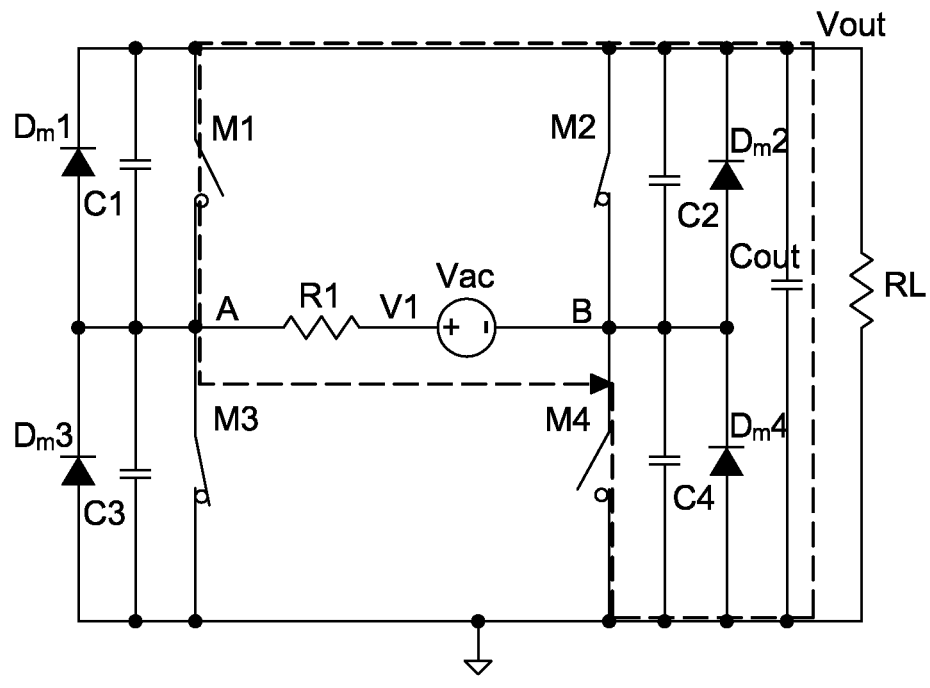
FIG. 14(h)  t7 < t < t8

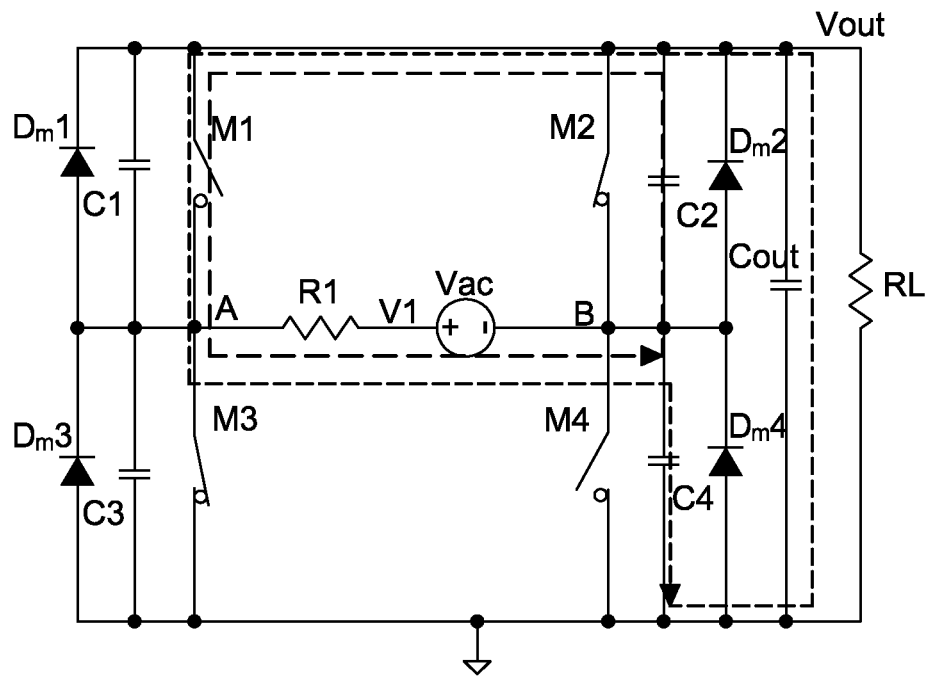
FIG. 14(i)  t8 < t < t9
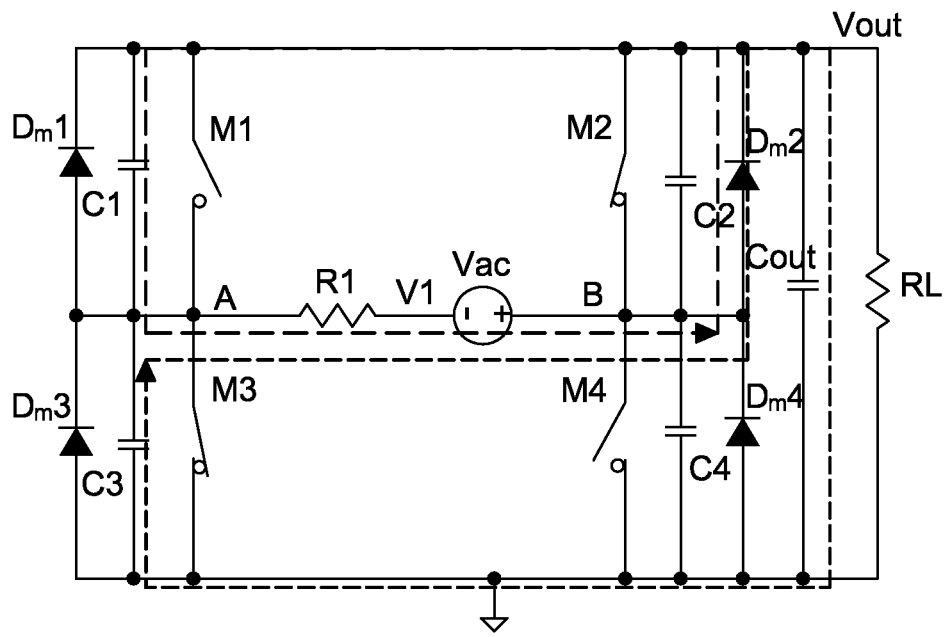
FIG. 14(j)  t9 < t < t10

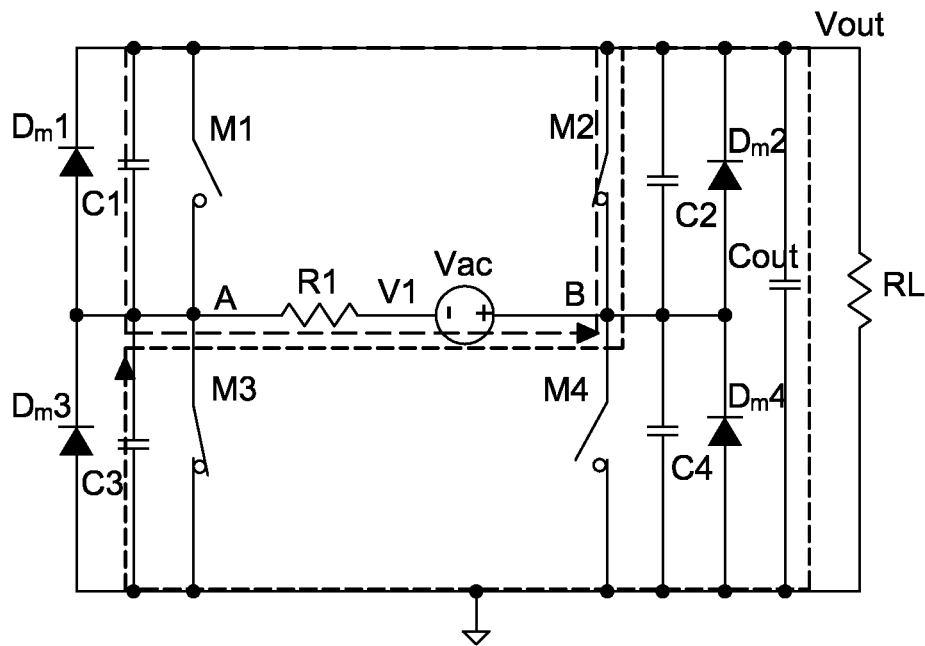
FIG. 14(k)  t10 < t < t11
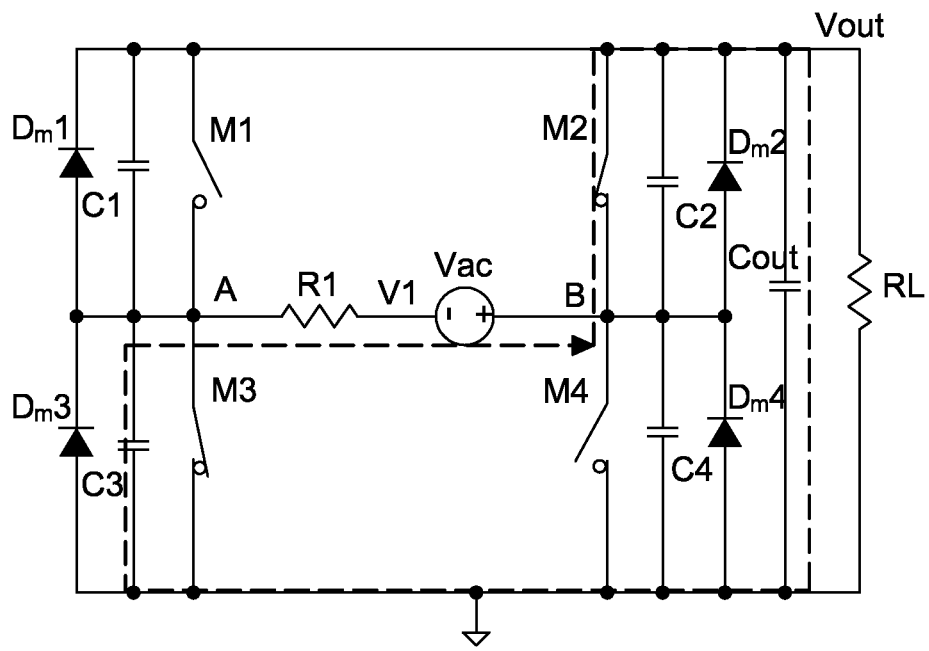
FIG. 14(l)  t11 < t < t12

SINGLE-PHASE SELF-DRIVEN FULL-BRIDGE SYNCHRONOUS RECTIFICATION

FIELD OF THE INVENTION

The present invention relates to methods and circuits for single-phase self-driven full-bridge synchronous rectification, and in particular though not exclusively to the application of such methods and circuits in the secondary circuits of inductively powered systems.

BACKGROUND OF THE INVENTION

The conduction loss of a diode rectifier contributes significantly to the overall power loss in a power supply, especially in low out-voltage applications. The rectifier conduction loss is the product of its forward-voltage drop, $V_F$, and the forward conduction current $I_F$. FIG. 1(a) shows one kind of rectifier circuit known as a 'current doubler'. Even when a low forward-voltage drop Schottky diode is used, the voltage drop across D1 or D2 (normally 0.3-0.4V) is still significant compared to the low output voltage (e.g. equal to or less than 5V). If the current through the diode is 1 A, the power loss from diodes is about 0.3 W-0.4 W, which is considerable, compared to the output power, e.g. 5 W.

One solution known in the prior art is 'synchronous rectification' (SR), i.e. using a low conduction loss active switch, such as a MOSFET, operating in the III quadrant to replace the diode. A n-channel (n-type) quadrant III MOSFET means that the source terminal is connected to a higher voltage than the drain terminal and current flows from source to drain. A p-channel (p-type) quadrant III MOSFET means that the drain terminal is connected to a higher voltage than the source terminal and current flows from drain to source. The internal resistance of a MOSFET during conduction is normally very low, which consequently reduces the rectifier conduction loss. FIG. 1(b) is a simple schematic of self-driven SR applied to current doubler. The gate drive scheme of the MOSFET is to cross-couple the drive to the input AC voltage.

The prior art describes self-driven SR applied to a Forward rectifier (e.g. reference J. Blanc, S, Inc, Santa Clara, Calif., "Practical application of MOSFET synchronous rectifiers", Telecommunications Energy Conference, 1991. INTELEC'91, 1991, U.S. Pat. No. 6,038,138, entitled "Self-driven synchronous rectification scheme", N. Murakami, H Namiki, K Sakakibara, T Yachi, "A Simple and Efficient Synchronous Rectifier for Forward DC-DC Converters", Applied Power Electronics Conference and Exposition, 1993, U.S. Pat. Nos. 5,625,541 and 5,872,705, entitled "Low loss synchronous rectifier for application to clamped-mode power converters", U.S. Pat. No. 6,288,920, entitled "Drive compensation circuit for synchronous rectifier and method of operating the same", W A Tabisz, F C Lee, D Y Chen, "A MOSFET resonant synchronous rectifier for high-frequency DC/DC converters", Power Electronics Specialists Conference, 1990. PESC'90 . . . , 1990), self-driven SR applied to a Center-tap rectifier (e.g. reference U.S. Pat. No. 6,011,703, entitled "Self-synchronized gate drive for power converter employing self-driven synchronous rectifier and method of operation thereof", U.S. Pat. No. 6,583,993, entitled "Self-driven synchronous rectification scheme for wide output range"), self-driven SR applied to a Current doubler (e.g. reference U.S. Pat. No. 6,069,799, entitled "Self-synchronized drive circuit for a synchronous rectifier in a clamped-mode power converter"), SR with an auxiliary winding applied to a Forward rectifier (e.g. reference "X. Xie, J C P Liu, F N K Poon, M H Pong, "A novel high frequency current-driven synchronous rectifier applicable to most switching topologies", Power Electronics, IEEE Transactions on, 2001, P. Alou, J A. Cobos, O. Garcia, R. Prieto, J. Uceda, "A new driving scheme for synchronous rectifiers: single winding self-driven synchronous rectification", Power Electronics, IEEE Transactions on, 2001, U.S. Pat. No. 6,301,139, entitled "Self-driven synchronous rectifier circuit for non-optimal reset secondary voltage"), SR with an auxiliary winding applied to a Center-tap rectifier (e.g. reference "X. Xie, J C P Liu, F N K Poon, M H Pong, "A novel high frequency current-driven synchronous rectifier applicable to most switching topologies", Power Electronics, IEEE Transactions on, 2001, P. Alou, J A. Cobos, O. Garcia, R. Prieto, J. Uceda, "A new driving scheme for synchronous rectifiers: single winding self-driven synchronous rectification", Power Electronics, IEEE Transactions on, 2001, A. Fernandez, J. Sebastian, M M Hernando, P J Villegas and Jorge Garcia, "New self-driven synchronous rectification system for converters with a symmetrically driven transformer", Industry Applications, IEEE Transactions on, 2005, T. Qian, W. Song, B. Lehman, "Self-Driven Synchronous Rectification Scheme Without Undesired Gate-Voltage Discharge for DC-DC Converters With Symmetrically Driven Transformers", Power Electronics, IEEE Transactions on, 2008), SR with an auxiliary winding applied to a Current doubler (e.g. reference "X. Xie, J C P Liu, F N K Poon, M H Pong, "A novel high frequency current-driven synchronous rectifier applicable to most switching topologies", Power Electronics, IEEE Transactions on, 2001, P. Alou, J A. Cobos, O. Garcia, R. Prieto, J. Uceda, "A new driving scheme for synchronous rectifiers: single winding self-driven synchronous rectification", Power Electronics, IEEE Transactions on, 2001, Y. Panov, M M Jovanovic , "Design and performance evaluation of low-voltage/high-current DC/DC on-board modules", Applied Power Electronics Conference and Exposition, 1999 . . . , 1999), external controlled SR applied to a Forward rectifier (e.g. reference C. Blake, D. Kinzer, P. Wood, "Synchronous Rectifiers versus Schottky Diodes: A Comparison of the Losses of a Synchronous Rectifier versus the Losses of a Schottky Diode Rectifier", IEEE Applied Power Electronics Conference (APEC), 1994, M M Jovanovic, M T Zhang, F C Lee, "Evaluation of synchronous-rectification efficiency improvement limits in forward converters", Industrial Electronics, IEEE Transactions on, 1995), external controlled SR applied to a Current doubler (e.g. reference H J Chiu, L W Lin, "A high-efficiency soft-switched AC/DC converter with current-doubler synchronous rectification", Industrial Electronics, IEEE Transactions on, 2005, U.S. Pat. No. 6,240,318, entitled "Transcutaneous energy transmission system with full wave Class E rectifier") and external controlled SR applied to a Flyback rectifier (e.g. reference M T Zhang, M M Jovanovic, F C Y Lee, "Design considerations and performance evaluations of synchronousrectification in flyback converters", Power Electronics, IEEE Transactions on, 1998).

In the above examples of the prior art, self-driven SR is the simplest, compared to the auxiliary winding version and the external controlled version, because no extra winding or extra controller is needed. From a review of the prior art, however, it can be seen that to date there has been no successful attempt to provide self-driven full-bridge SR. A full-bridge rectifier is an important rectifier circuit which has wide applications. A typical single-phase full-bridge rectifier is shown in FIG. 2. The AC input can be a current source or a voltage source. In the first half cycle as shown in FIG. 2(a), current flows through the input, diode D1, the load and diode D4, which is called a current loop. When current direction reverses, diode D1 and D4 turn off automatically. Current then flows through the input, diode D2, the load and diode D3, as shown in FIG. 2(b), which is another current loop. It must be noted that the automatic turn-off property of a diode is critical to the normal operation of the circuit. A practical self-driven full-bridge SR must therefore have a mechanism of sensing the reverse current for turning off the appropriate switches.

By extending the existing self-driven SR which has been applied to other rectifiers (like the one in FIG. 1(b)), one may derive a straightforward self-driven full-bridge SR circuit, as shown in FIG. 3(a), in which four diodes are replaced by two p-type MOSFETs, M1 and M2, and two n-type MOSFETs, M3 and M4. M1 and M3 are driven by sensing the voltage of point B, while M2 and M4 are driven by sensing the voltage of point A. Such approach is called 'voltage controlled self-driven' (VCSD) because the driving signal is coupled to voltage. However, there is a defect in this circuit. As shown in FIG. 3(b), the current loop through M1 and M4 can flow in both directions, because VCSD gate drive cannot detect the reverse current. So does the loop through M2 and M3. Unlike the diodes in FIG. 2, which can automatically turn off when their current reverses, such bidirectional switch current flow can make the commutation fail.

Some prior art has dealt with full-bridge SR with other approaches. U.S. Pat. No. 7,269,038, entitled "VRMs and rectified current sense full-bridge synchronous-rectification integrated with PFC" employs an external controller that is suitable for the application of PFC (Power Factor Correction). Also known in the prior art is "A Rechargeable Battery Circuit and Structure for Compatibility with a Planar Inductive Charging Platform (U.S. patent application Ser. No. 11/234,045), but that proposal needs the help of a resonant capacitor at the secondary winding creating a sinusoidal voltage waveform and a smoothing inductor at the output to enhance the turn-off timing. But the passive capacitor and inductor are large in size and this inevitably creates a large dead-time between the driving pulses that adversely affects the duration of power transfer in one cycle. This kind of approach has a major limitation. Eventually it changes its tactic to use an external digital PLL controlled SR to achieve its miniature. It is still not a self-driven full-bridge SR.

SUMMARY OF THE INVENTION

According to the present invention there is provided a full-bridge rectifier configured to provide synchronous rectification with either a current-source or a voltage-source, said rectifier comprising an upper branch and a lower branch and two current loops, each said branch comprising voltage- or current-controlled active switches, diodes or combinations thereof selected such that each said loop includes one active switch or diode from said upper branch and one active switch or diode from said lower branch, and wherein each said current loop comprises at least one diode or current-controlled active switch, and wherein at least one voltage- or current-controlled active switch is included in one of said upper or lower branches.

Preferably the voltage- and current-controlled active switches are self-driven and do not require external control signals. For example the voltage-controlled active switch may be driven by an input ac voltage provided to the switch by a gate drive circuit. The current-controlled active switch may be driven by sensing the current direction of the switch and providing a signal to a gate drive circuit dependent on the current direction.

In one embodiment of the invention the upper branch comprises two voltage-controlled active switches and said lower branch comprises two current-controlled active switches, or one current-controlled switch and one diode, or two diodes.

In a further embodiment of the invention the upper branch comprises one voltage-controlled active switch and one current-controlled active switch or diode, and the lower branch comprises one voltage-controlled active switch and one current-controlled active switch or diode, wherein said current-controlled active switch(es) or diode(s) are not provided in the same current loop.

In a still further embodiment of the invention the upper branch comprises one voltage-controlled active switch and one current-controlled active switch or diode, and the lower branch comprises two current-controlled active switches, or one current-controlled switch and one diode, or two diodes.

In a still further embodiment of the invention the upper branch comprises two current-controlled active switches, or one current-controlled switch and one diode, or two diodes, and the lower branch comprises two voltage-controlled active switches.

In a still further embodiment of the invention the upper branch comprises two current-controlled active switches, or one current-controlled switch and one diode, or two diodes, and the lower branch comprises one voltage-controlled active switch and one current-controlled switch or one diode.

In a still further embodiment of the invention the rectifier comprises a current-controlled active switch in either the upper or lower branch and three diodes.

In one embodiment the rectifier may comprise four current-controlled active switches.

The rectifier may be configured to receive a current source or a voltage source.

The active switches preferably comprise power MOSFETs.

According to another aspect of the invention there is provided an energy receiving circuit for use in an inductive power transfer system, comprising:

a winding, a capacitor connected in series with said winding to form a current source, said current source being input to a full-bridge rectifier comprising an upper branch and a lower branch and two current loops, each said branch comprising voltage- or current-controlled active switches, diodes or combinations thereof selected such that each said loop includes one active switch or diode from said upper branch and one active switch or diode from said lower branch, and wherein each said current loop comprises at least one diode or current-controlled active switch, and wherein at least one voltage- or current-controlled active switch is included in one of said upper or lower branches.

These, and other objects, features and advantages of this invention will become apparent from the following detailed description of the various aspects of the invention taken in conjunction with the accompanying drawings.

BRIEF DESCRIPTION OF THE DRAWINGS

Some embodiments of the invention will now be described by way of example and with reference to the accompanying drawings, in which:

FIGS. 6(a)-(f) show current flows in the circuit of FIG. 5.

FIGS. 10(a)-(j) show current flows in the circuit of FIG. 9.

FIGS. 14(a)-(l) show current flows in the circuit of FIG. 13.

DETAILED DESCRIPTION OF THE INVENTION

Figure 3A:
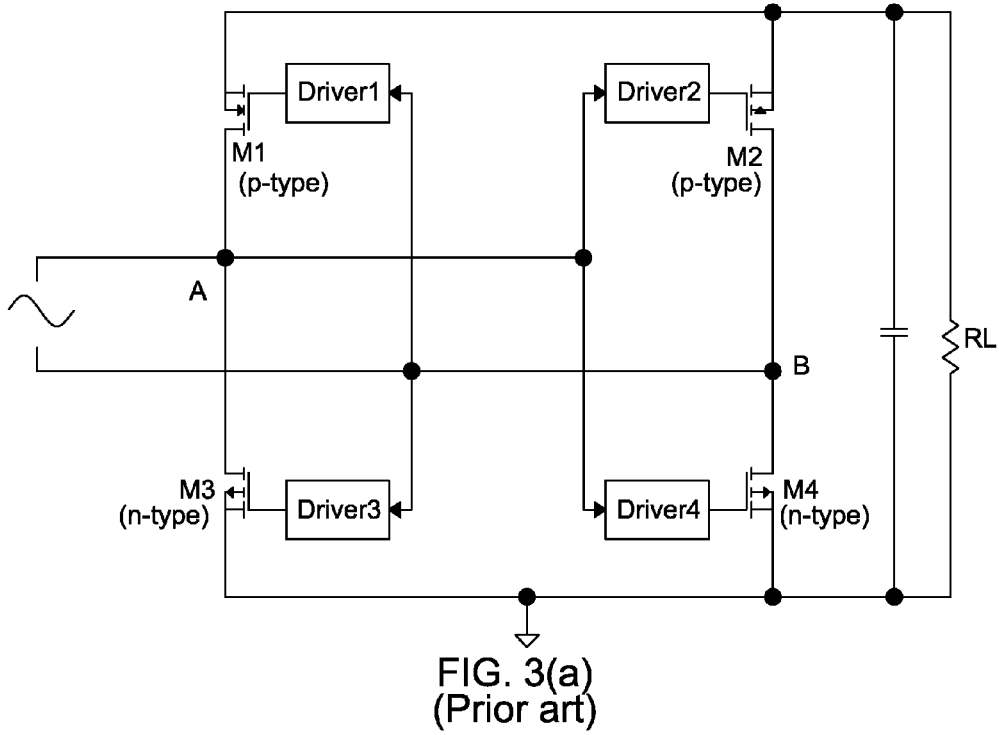
FIG. 3 is a diagram illustrating the problem of simply replacing the diodes with MOSFETs without sensing the reverse current.

To solve the defect in the circuit shown in FIG. 3, a new principle is proposed herein as described below.

Figure 3B:
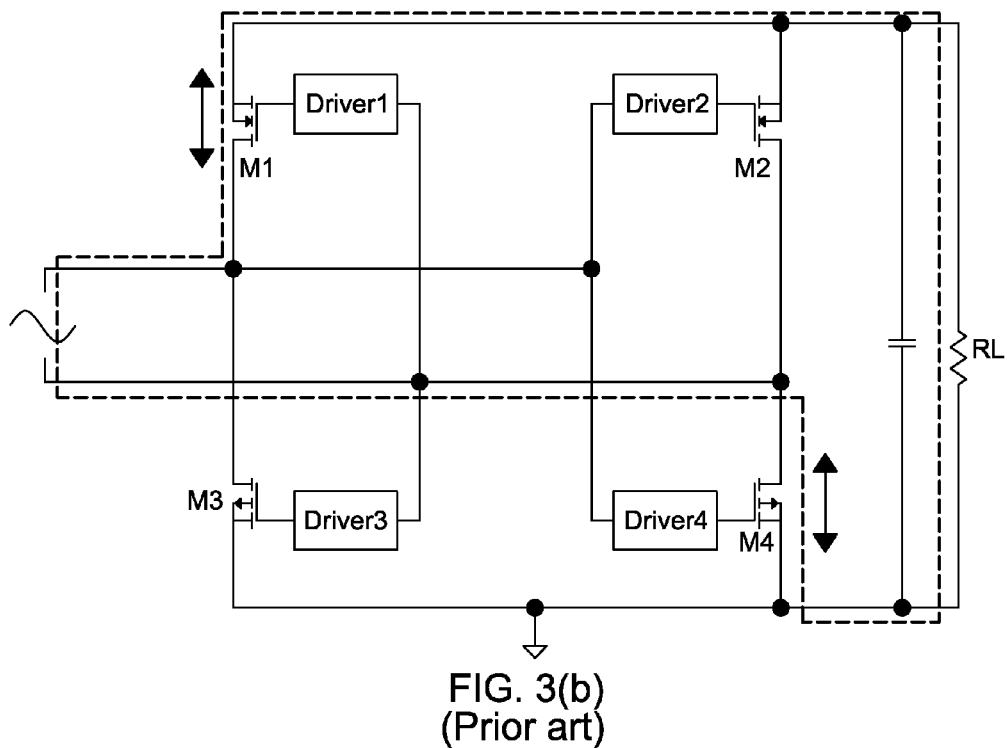
Figure 4:
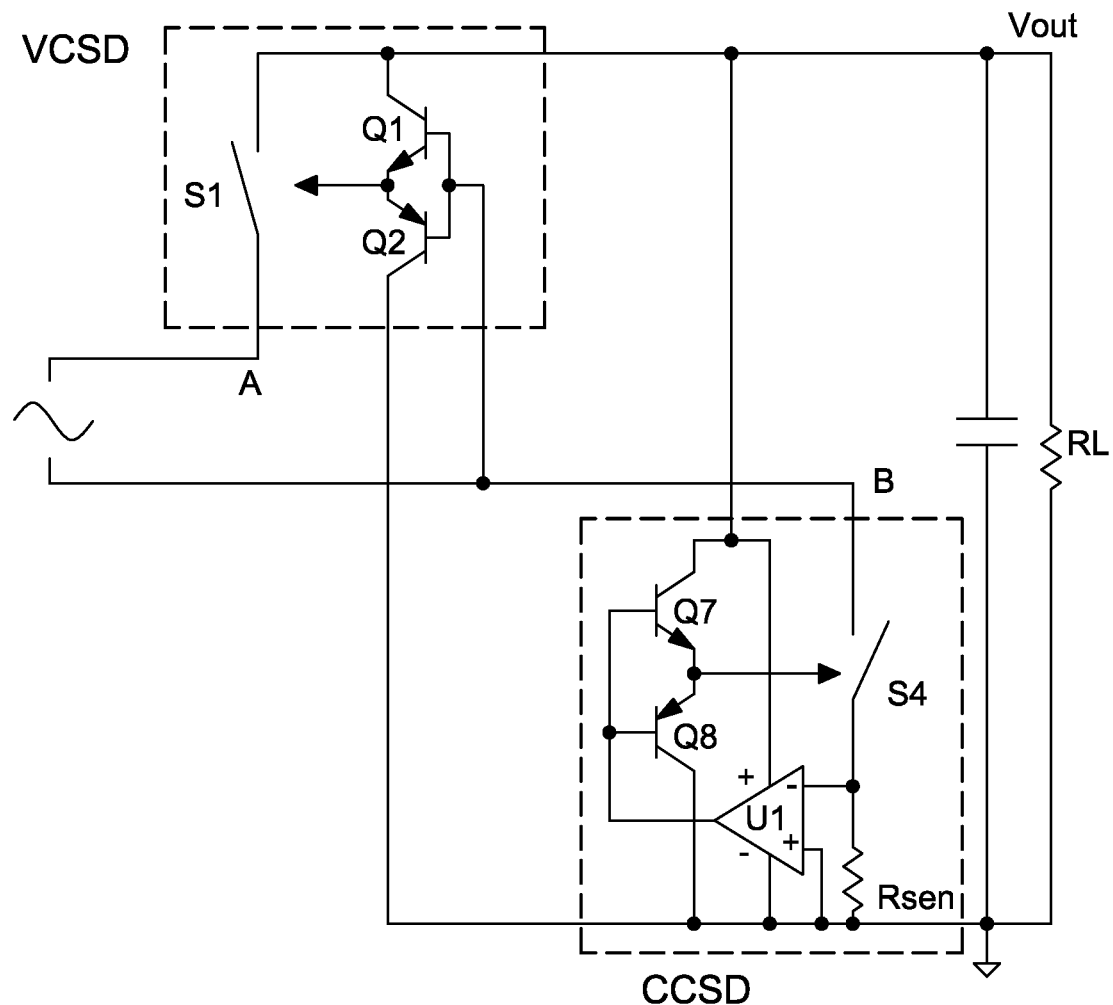
FIG. 4 is an embodiment of one current loop and the implementation of VCSD and CCSD.

In any current loop (like the one formed by M1 and M4 in FIG. 3(b)), there cannot exist two voltage controlled self-driven (VCSD) MOSFETs. At least one of the switches in each current loop must be either a diode or an active switch with a similar property to a diode in that the active switch will be turned off when its current is reversed. In FIG. 4, for a clear view, take only one current loop formed by S1 and S4 as an example. Suppose S1 is a VCSD active switch, then S4 must be either a diode or an active switch that has the capability of blocking current flow when the current is in reverse direction. In FIG. 4, the implementation of the switches is also illustrated. S1 is a VCSD MOSFET and is driven by the complementary gate drive circuit formed by Q1 and Q2, and the input of this gate drive circuit is cross-connected to one input voltage terminal (Point B in this example). S4 can be a diode or an active switch. If it is an active switch, it must be controlled by sensing the current. Such an active switch may be termed a current-controlled self-driven (CCSD) active switch. As shown in FIG. 4, a sensing resistor Rsen is used to detect the current flow direction of S4. Comparator U1 can produce the driving pulses according to the current flow direction detected by Rsen. A positive current through S4 ('positive' is defined as current flow from ground to point B) will cause the output of comparator U1 to be high. The high voltage level of the comparator output, in turn, will drive the complementary gate drive circuit formed by Q7 and Q8. S4 is therefore turned ON according to its positive current flow direction and turned OFF in opposite manner. Both the VCSD and the CCSD active switches are self-driven in the sense that they do not require external control circuitry.

A detailed description of the above principle will be given with the following examples.

Example 1

Figure 5:
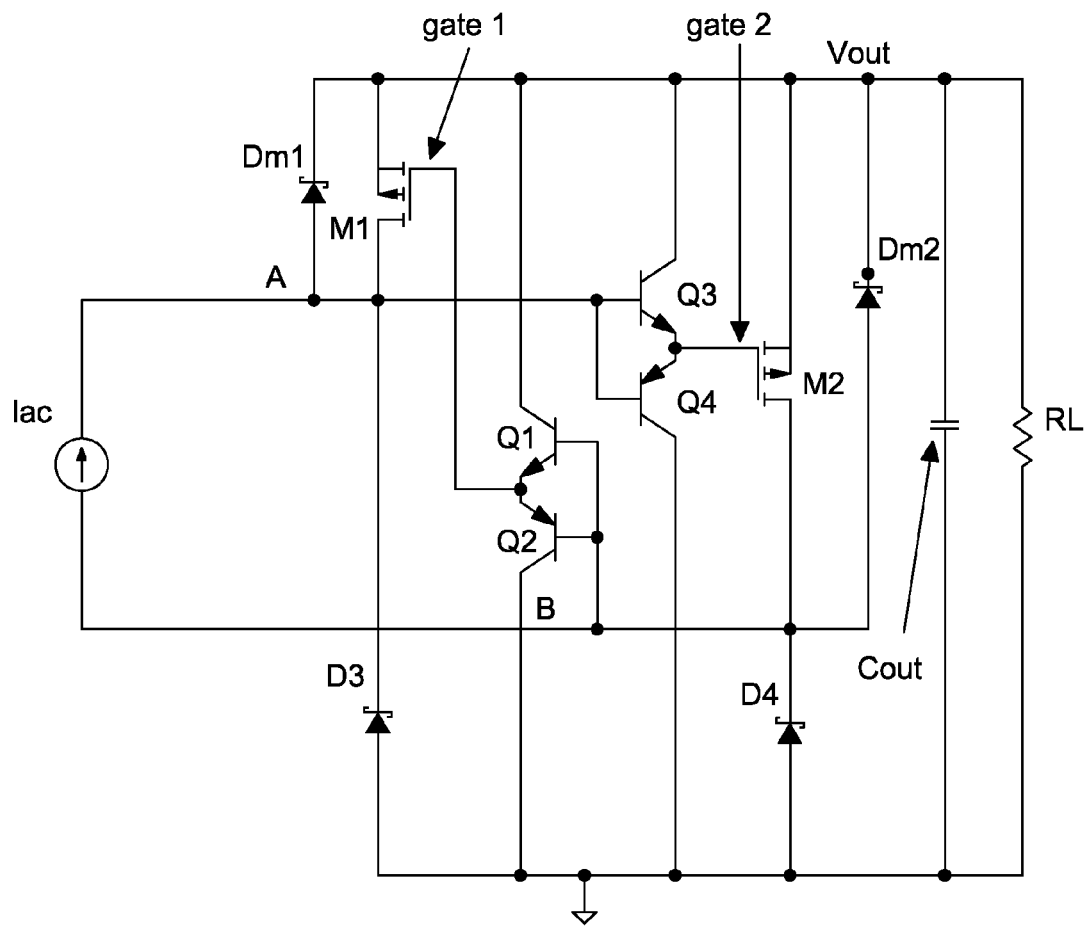
FIG. 5 is a circuit diagram showing a current-source input upper half VCSD full-bridge synchronous rectification circuit according to an embodiment of the present invention.

A first embodiment of the invention may take the form of a current-source input upper half VCSD full-bridge synchronous rectification (SR) as shown in FIG. 5

Figure 7:
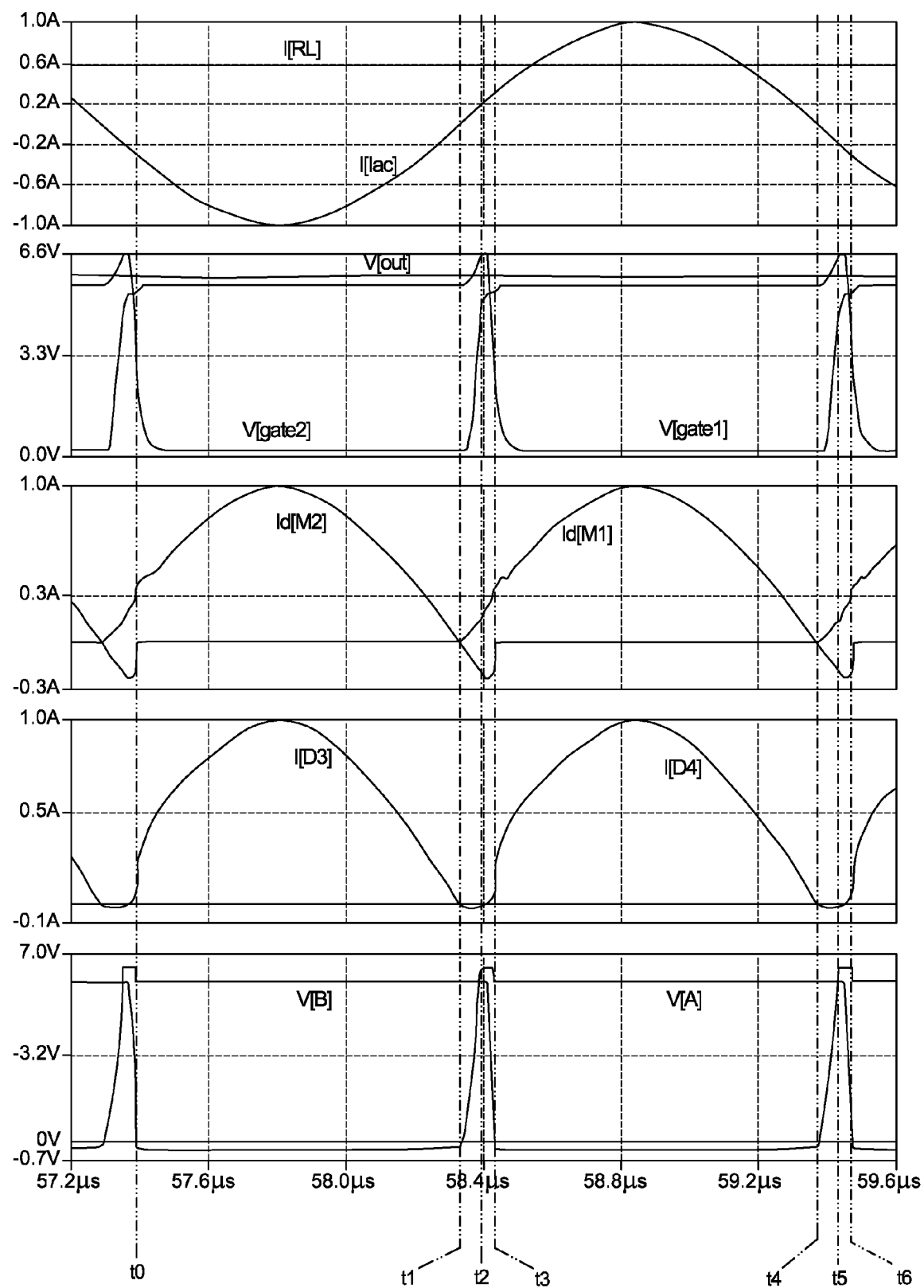
FIG. 7 shows waveforms of the circuit of FIG. 5.

Two p-type power MOSFETs, M1 and M2, replace the upper diodes (D1 and D2 in FIG. 2) of the left and right branches of the diode-bridge. Dm1 and Dm2 can be either the body diode of the two MOSFETs or added external diodes. In this configuration MOSFET M1 has its gate signal controlled by $V_B$ and MOSFET M2 has its gate signal controlled by voltage VA. Both MOSFET gates are cross-connected against the current-source input terminals (point A and point B) through the complementary gate drive circuits formed by the Q1-Q2 pair and Q3-Q4 pair. A gate drive buffer (totem poles, drivers or direct connection) between the current-source input and the MOSFETs can be used to drive the power switches to be ON/OFF accordingly. In FIG. 6 and FIG. 7, at time t0 the current direction of the current source starts from point A to point B. Upper right MOSFET M2 is driven to be fully ON by the low voltage appearing at point A. Input current flows to load RL and output filter capacitor Cout in the path of M2 and D3 in t0<t<t1. When the input current reaches zero and reverses its direction from point B to point A, diode D3 is automatically OFF as it is reverse biased, but M2 is still ON as VA is still kept low. However, M2's current (t1<t<t2) flows in reverse manner and discharges the body capacitance, C1, of M1. Voltage at point A rises linearly and increases the gate voltage of M2. When the negative gate threshold voltage of M2 cannot be sustained, M2 will be OFF, and the voltage VA keeps increasing until it reaches Vout and starts forward biasing the external diode or body diode of M1 (t2<t<t3). Since the input current is still flowing in reverse direction, it can charge up the body capacitance, C2, of M2, and the voltage of point B, $V_B$, drops off rapidly. When $V_B$ is lower than the negative threshold gate voltage of M1, M1 is caused to conduct. Finally voltage $V_B$ is low enough to let D4 conduct and drive M1 to be fully saturated. Power transfer from current source through D4 and M1 to output is observed (t3<t<t4).

After a half cycle the input current flips over its direction again. Current is no longer flowing through diode D4. M1 is still ON as $V_B$ is low, sustaining the negative threshold gate voltage of M1. Reverse current at M1 starts to discharge capacitance C2 (t4<t<t5). Once the voltage $V_B$ reaches close to Vout, it turns M1 OFF, and C2 is completely discharged. Diode Dm2 catches up the current flow and causes voltage $V_B$ to be high. C1 is discharged (t5<t<t6), and voltage $V_A$ will drop off and finally be low enough to turn M2 ON. A complete current flow from current source to output through D3 and M2 repeats after time t6.

Figure 1A:
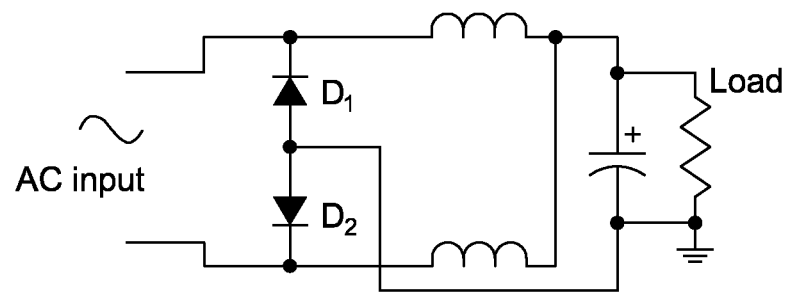
FIG. 1(a) is a circuit diagram of a current doubler rectifier according to the prior art.
Figure 1B:
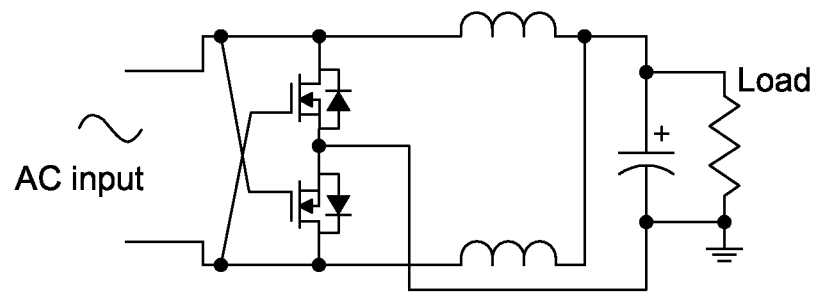
FIG. 1(b) shows the application of self-driven SR to the current doubler of FIG. 1(a)
Figure 2A:
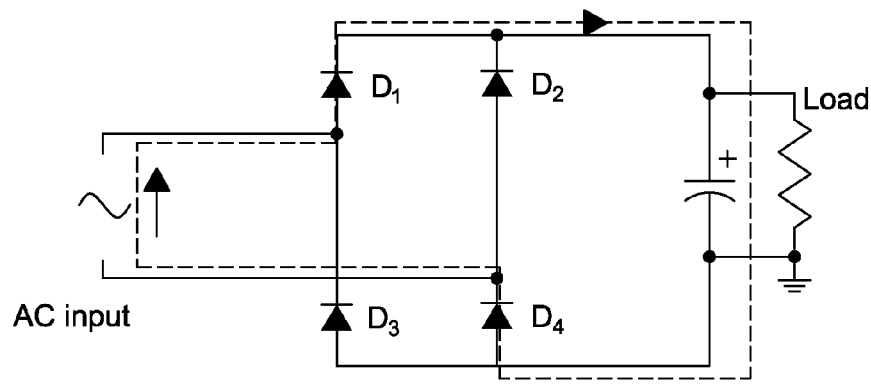
FIG. 2 is diode full-bridge rectifier according to prior art.
Figure 2B:
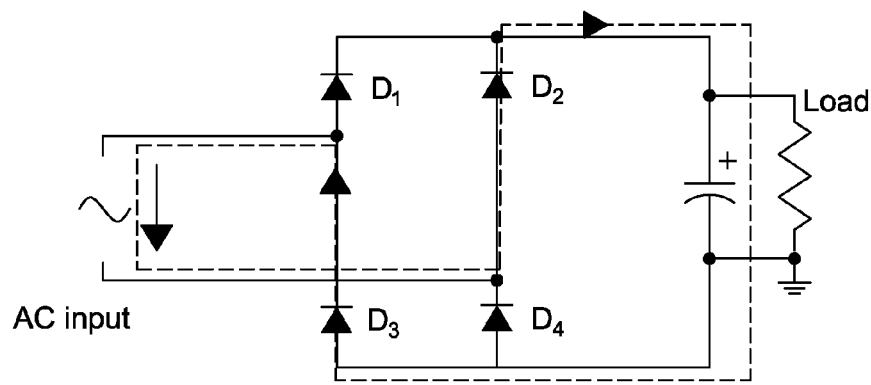
Figure 8:
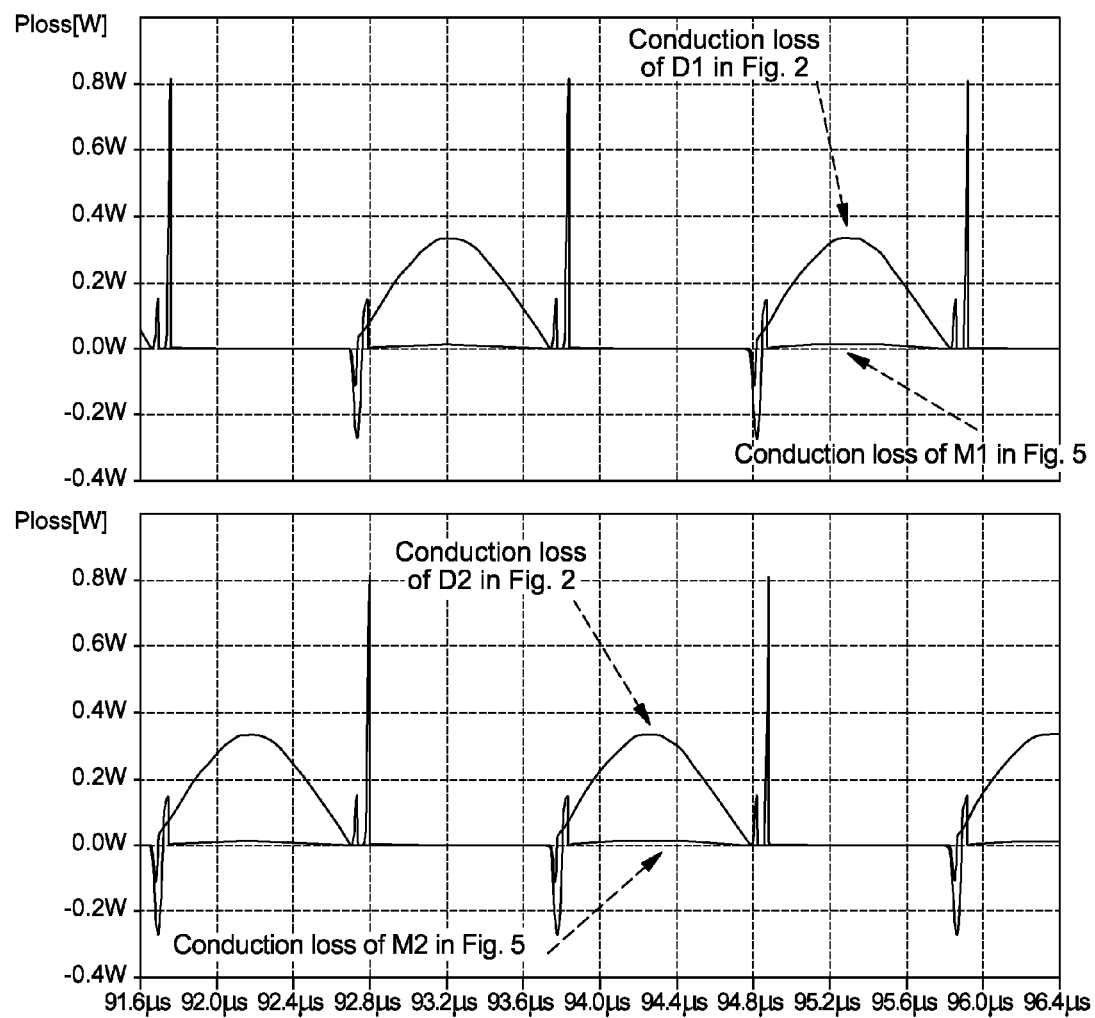
FIG. 8 shows a comparison of conduction losses between Schottky diodes used in a full-bridge rectifier (FIG. 2) and active switches (MOSFETs) used in a SD SR (FIG. 5).

FIG. 8 shows a simulated comparison of conduction losses between Schottky diodes used in FIG. 2 and active switches (e.g. MOSFETs) used in FIG. 5. In the simulation, consider a 1 A current source and a load of 10 Ohms as an example. The simulation shows that the conduction loss of each Schottky diode (0.35V forward drop) contributes an average power loss of around 100 mW in a cycle, while each active switch (e.g. MOSFET Si4403DY from Vishay, with 17 mOhm ON-resistance) introduces an average loss of about 5 mW. The comparative ratio is rather large on the order of ten.

In this example, since a diode exists in each current loop, the two active switches need not be turned off by sensing their reverse current. But it must be stressed that the two diodes must be placed in either the upper half of the branches or the lower half of the branches. They must not be placed in the diagonal positions.

Example 2

Figure 9:
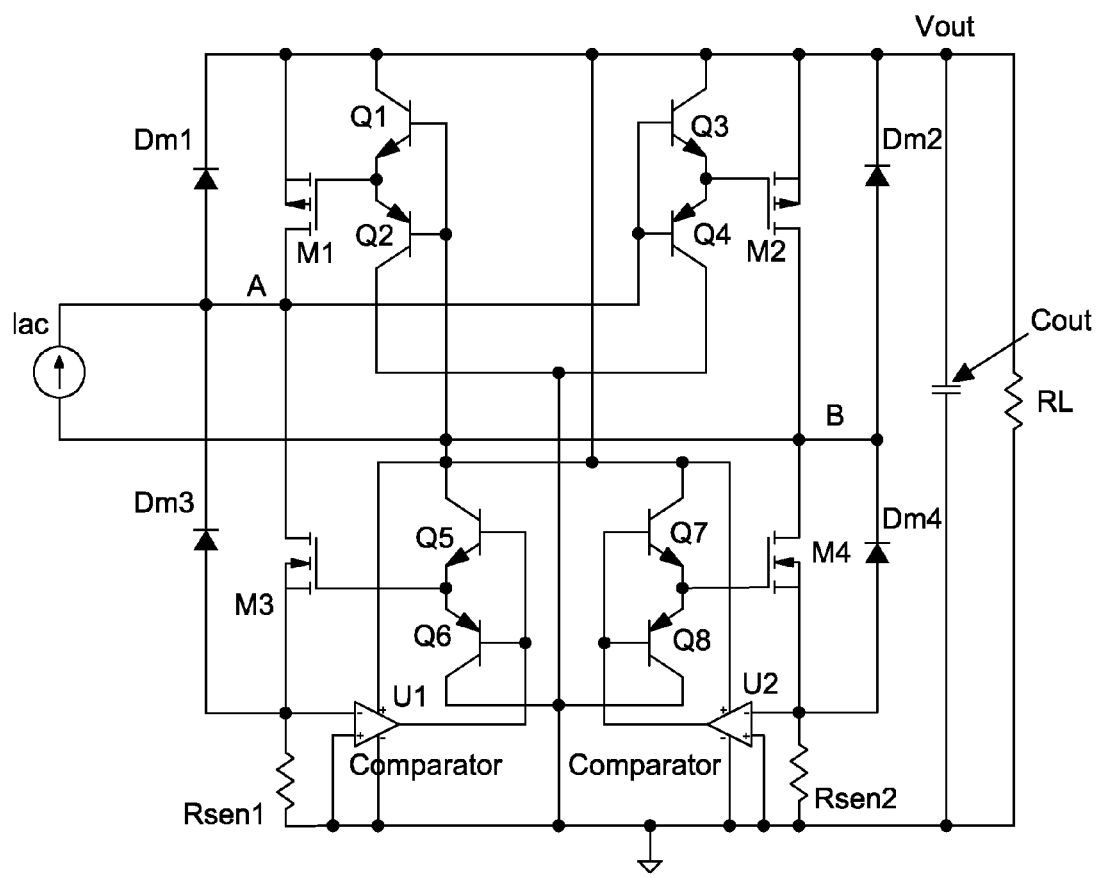
FIG. 9 is a circuit diagram showing a current-source input upper half VCSD and lower half CCSD full-bridge synchronous rectification circuit according to an embodiment of the present invention.

In order to further reduce the power loss in the diodes, a second embodiment of the invention comprises current-source input upper half VCSD and lower half 'current controlled self-driven' (CCSD) full-bridge synchronous rectification (SR) as shown in FIG. 9. In this case D3 and D4 in FIG. 5 are replaced with two n-type MOSFETs, M3 and M4, respectively.

As shown in FIG. 9, sensing resistors Rsen1 and Rsen2 are placed at both sides of the lower legs for detecting the current flow direction of M3 and M4 (defining positive current flow from ground up to Vout). Comparators U1 and U2 are used to produce driving pulses according to the current flow direction at Rsen1 and Rsen2. The voltage supplies of U1 and U2 can be directly derived from the rectified DC bulk voltage at the DC output, Vout, as this is the most cost effective method (or indirectly derived from an auxiliary power supply). A positive current through M3 and Dm3 or M4 and Dm4 will cause the output of comparator U1 or U2 go to high status. The high voltage level of the comparator output, in turn, will drive the buffer Q5 or Q7 (totem pole or driver). Power switch M3 or M4 will be turned ON according to its positive current flow direction and it will be turned OFF in opposite manner. Two p-type MOSFETs are placed at the upper branch of the bridge, which form the upper half of the SD SR, and the gate drives use voltage control without reverse current sensing.

Figure 11:
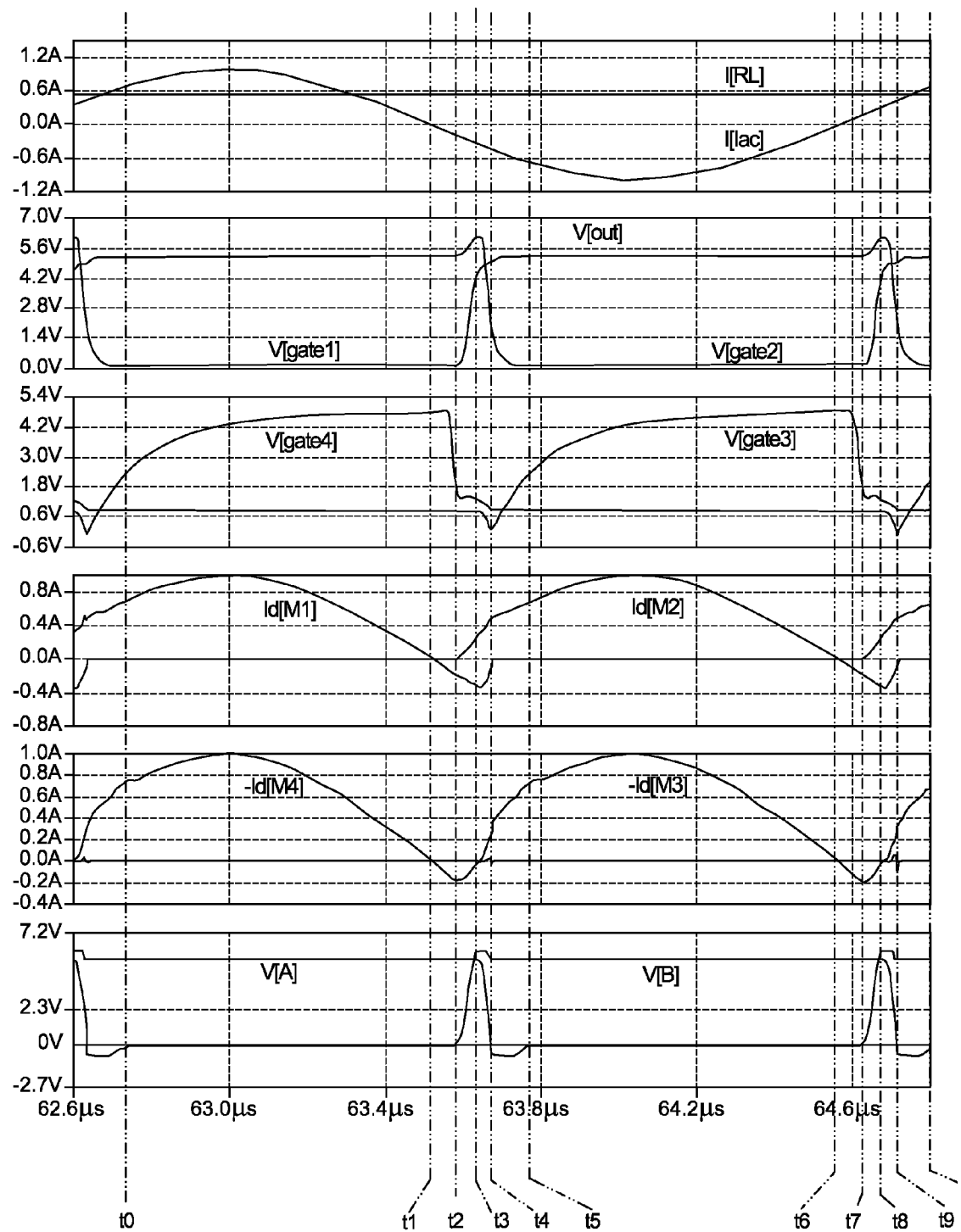
FIG. 11 shows waveforms of the circuit of FIG. 9.

The operation of this embodiment starts at t0. Input current flows from point B to point A in FIG. 10 and FIG. 11. Both power MOSFETs M1 and M4 are ON. Voltage $V_A$ is at the level of Vout, and voltage $V_B$ is at ground level (t0<t<t1). This period finishes when the input current changes its current direction in opposite way. M1 and M4 are still ON for a very short period (t1<t<t2). The reverse voltage developed at Rsen2 will trigger the comparator U2 to flip over, latching buffer Q8. M4 is then OFF. M1 is still ON as $V_B$ is at low state (t2<t<t3). The reverse current flow discharges C2 (external or body capacitance) of M2 in the path (M1, C2) and at the same time charges up C4 of M4 in the path (M1, C4, RL, Cout). In the process of rising to Vout, $V_B$ gradually reduces the negative threshold gate voltage of M1. Eventually M1 is OFF and Dm2 is ON when $V_B$ reaches the output voltage Vout (t3<t<t4). At this moment C1 of M1 is being charged in the path (Dm2, C1) and C3 of M3 is being discharged in the path (Dm2, RL, Cout, C3). $V_A$ drops off and reaches to ground shortly. The low voltage level of $V_A$ and the forward bias of Dm3 (external or body diode) of M3 will cause M2 switch to ON (t4<t<t5). The positive current flow at Rsen1 enables the comparator U1 to drive the buffer Q5. M3 will be then turned ON by its positive current flow, and the next half power transfer cycle begins (t5<t<t6).

This half period ends when the input current changes its current direction. M2 and M3 are still ON for a short period (t6<t<t7). The reverse voltage developed at Rsen1 can cause the comparator U1 to flip over, latching buffer Q6. M3 is then OFF. M2 is still ON as $V_A$ is at a low state (t7<t<t8). The reverse current flow discharges C1 of M1 in the path (M2, C1) and at the same time charges up C3 of M3 in the path (M2, C3, RL, Cout). In the process of rising to Vout, $V_A$ gradually reduces the negative threshold gate voltage of M2. Eventually M2 is OFF and Dm1 is ON when $V_A$ reaches the output voltage Vout (t8<t<t9). At this moment C2 of M2 is being charged in the path (Dm1, C2) and C4 of M4 is being discharged in the path (Dm1, RL, Cout, C4). $V_B$ drops off and reaches to ground shortly. The low voltage level of $V_B$ and the forward bias of Dm4 will cause M1 to turn ON (t9<t<t10). The source current repeats the cycle again.

Figure 12:
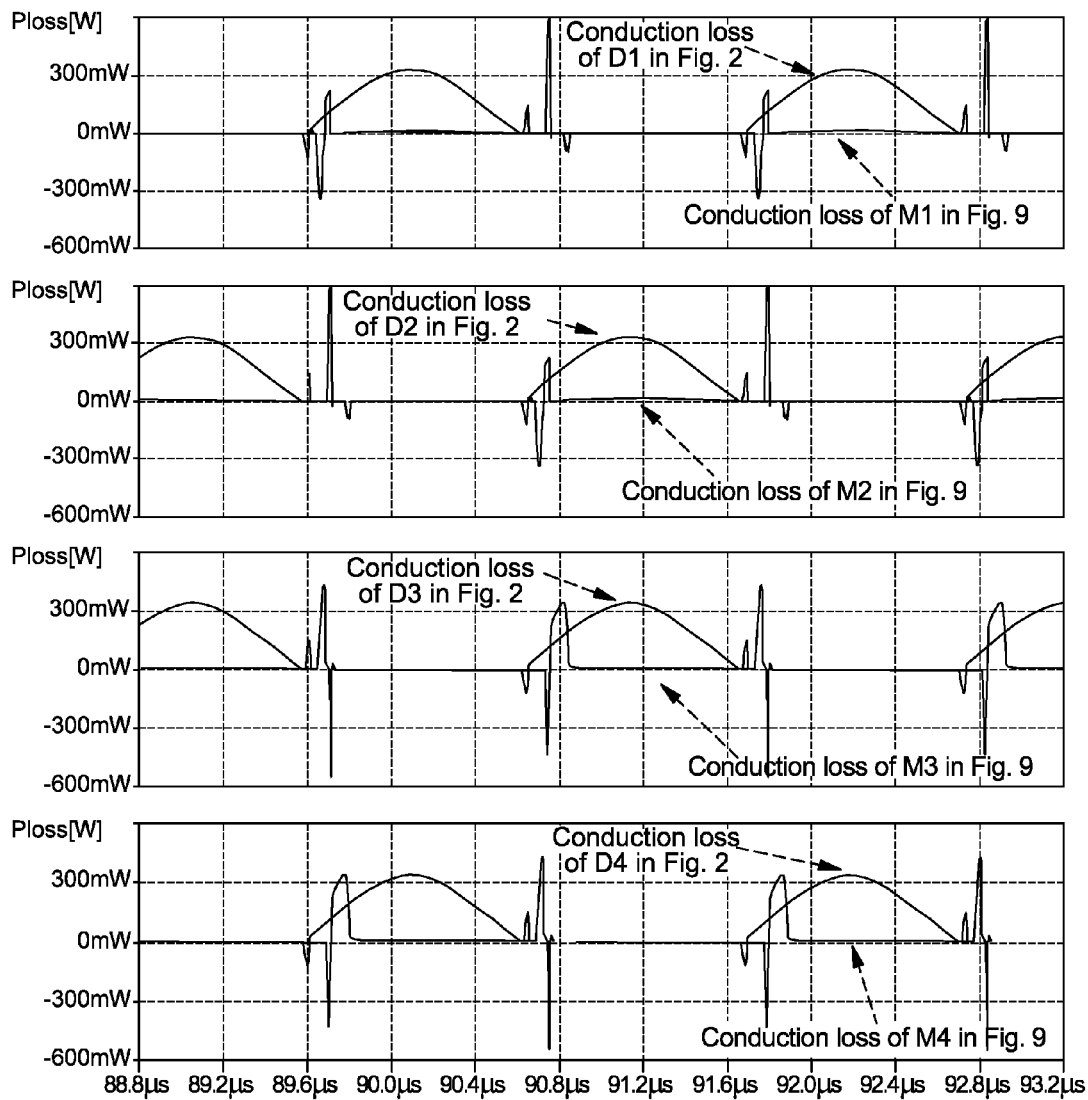
FIG. 12 shows a comparison of conduction losses between Schottky diodes used in a full-bridge rectifier (FIG. 2) and active switches (MOSFETs) used in a SD SR (FIG. 9).

FIG. 12 shows a simulated comparison of conduction losses between Schottky diodes used in FIG. 2 and active switches (e.g. MOSFETs) used in FIG. 9. In the simulation, take 1 A current source and a load of 10 Ohms as an example. The simulation shows that the conduction loss of each Schottky diode (0.35V forward drop) contributes an average power loss of around 100 mW in a cycle, while each active switch (e.g. MOSFET Si4403DY from Vishay, with 17 mOhm ON-resistance) introduces an average loss of about 5 mW. The comparative ratio is rather large on the order of ten.

Similar circuit performance can be achieved by putting the two CCSD MOSFETs in the upper half of the rectifier and the two VCSD MOSFETs in the lower half of the rectifier. It must be stressed that the two CCSD MOSFETs must be placed either in the upper half or lower half of the rectifier. It is also feasible that all the four switches in a rectifier are CCSD MOSFETs.

Example 3

Figure 13:
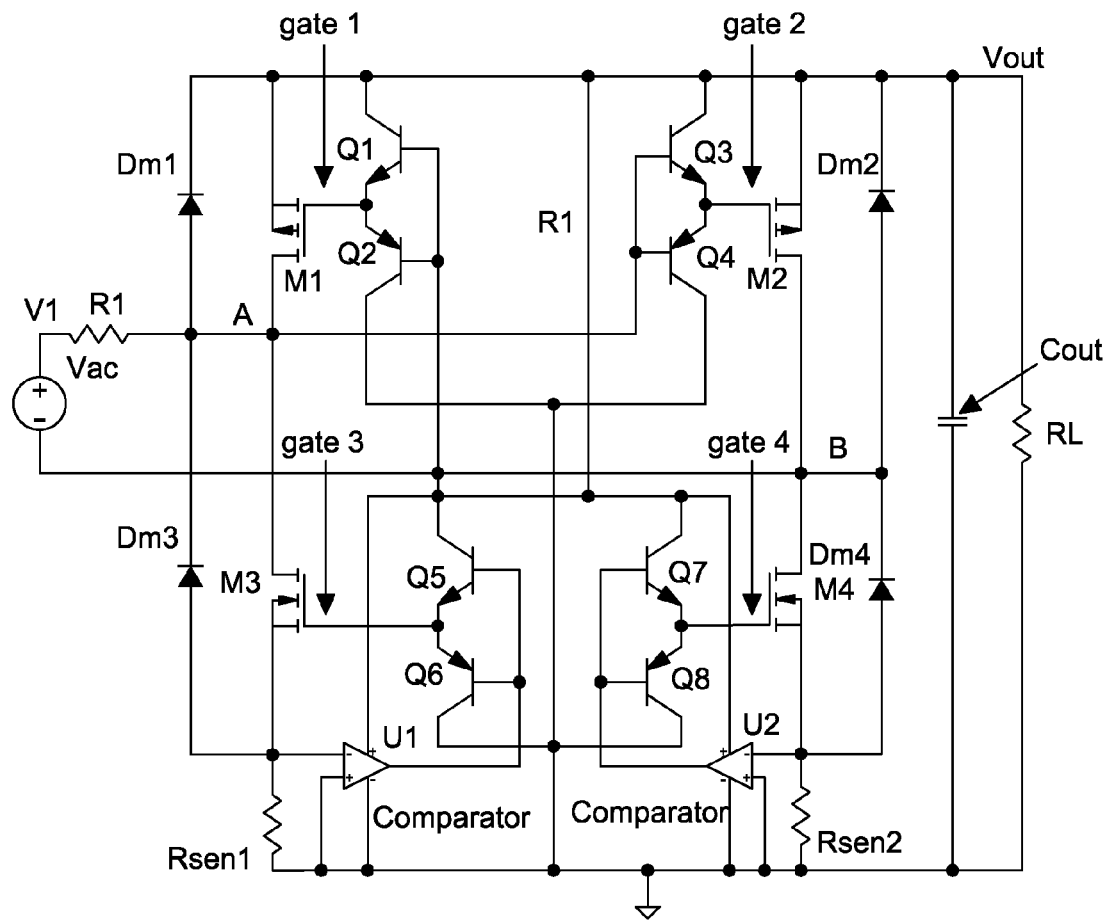
FIG. 13 is a circuit diagram showing a voltage-source input upper half VCSD and lower half CCSD full-bridge synchronous rectification circuit according to an embodiment of the present invention.

A third embodiment of the invention may take the form of voltage-source input upper half VCSD lower half CCSD full-bridge synchronous rectification as shown in FIG. 13.

Figure 15:
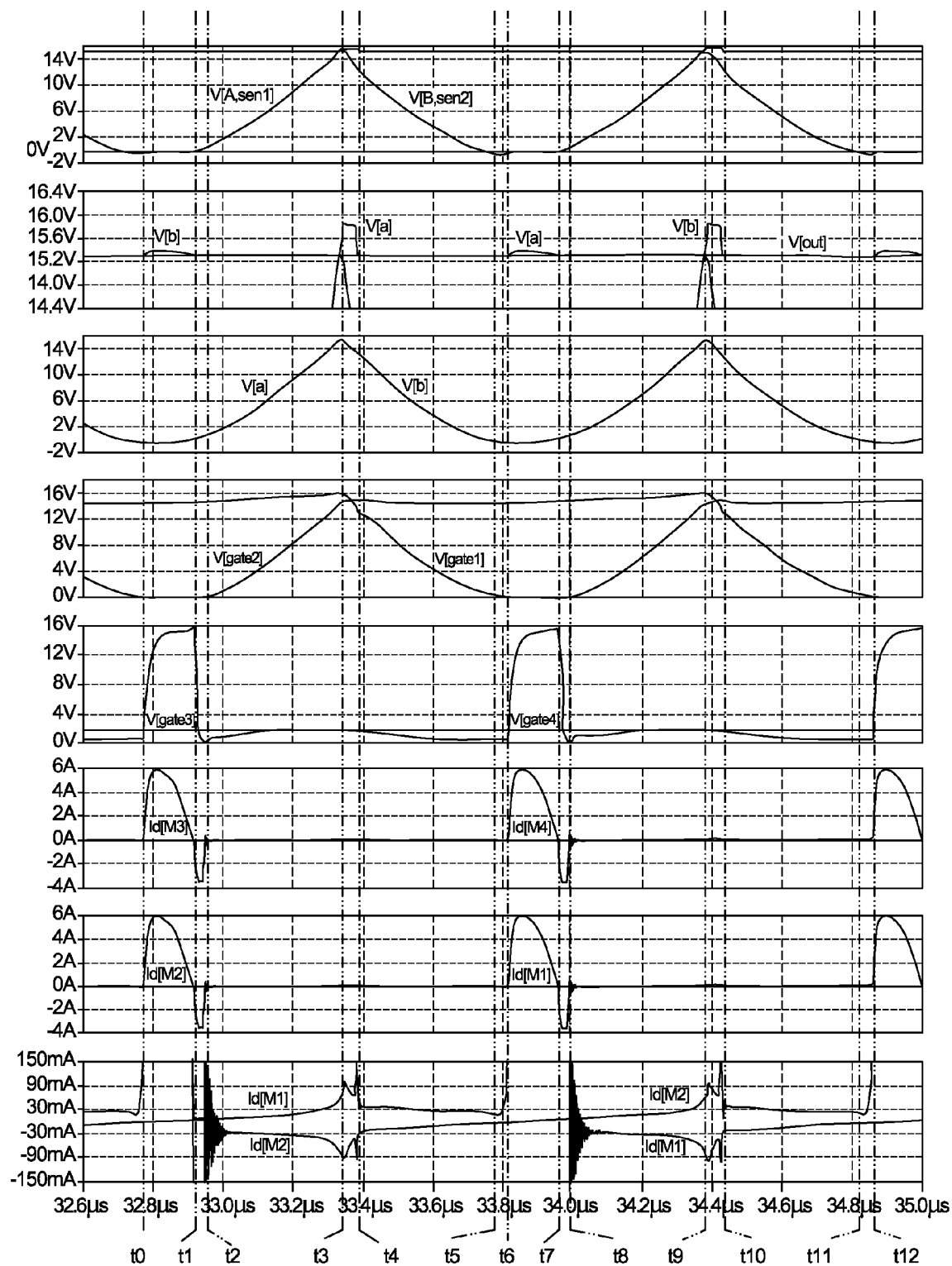
FIG. 15 shows waveforms of the circuit of FIG. 13.

The input of the proposed full-bridge SR can also be a voltage source, besides the current source in examples 1 and 2. A full version of voltage-source-input self-driven full-bridge SR is shown in FIG. 13. Sensing resistors Rsen1 and Rsen2 are placed at both the lower legs of the bridge for detecting the current flow direction (defining positive current flow from ground up to Vout). Comparator U1 and U2 are used to produce driving pulses according to the current flow direction at Rsen1 and Rsen2. A positive current at M3 and Dm3 or M4 and Dm4 will make output of comparator U1 or U2 go to high level. The high voltage level of the comparator, in turn, will drive the buffer Q5 or Q7 (totem pole or driver). Power switch M3 or M4 will be turned ON according to its positive current flow direction and it will be turned OFF in opposite manner. Two p-type MOSFETs are at the upper branches of the bridge, which form the upper half VCSD SR. The operation of this application starts at t0. Input current flows from point A to point B in FIG. 14 and FIG. 15. Both power MOSFETs M2 and M3 are ON. Voltage $V_B$ is at the level of Vout and voltage $V_A$ is at ground level (t0<t<t1). This period finishes when the voltage $V_B$ is less than the output voltage Vout. The input source current keeps continuous flowing but changes its current direction in opposite way (t1<t<t2). The reverse voltage developed at Rsen1 will trigger the comparator U1 to flip over, latching buffer Q6. M3 is then turned off. M2 is still ON as $V_A$ is at a low state, but it stops power transferring to the output in this transition period (t2<t<t3). The reverse current flow discharges C1 (external or body capacitance) of M1 in the path (M2, C1) and at the same time charges up C3 of M3 in the path (M2, C3, RL, Cout). In the process of rising to Vout, $V_A$ gradually reduces the negative threshold gate voltage of M2. Eventually M2 is OFF and Dm1 conducts. $V_A$ reaches the output voltage Vout (t3<t<t4). At this moment C2 of M2 is being charged in the path (Dm1, C2) and C4 of M4 is being discharged in the path (Dm1, RL, Cout, C4). $V_B$ drops off. The fall of $V_B$ creates a negative threshold voltage for M1, which is then turning ON immediately. However, the input AC voltage is far less than the output voltage, Vout. No power is transferred to the output in this transition period (t4<t<t5). Once the voltage $V_B$ is low enough to forward bias the diode Dm4 of M4 (t5<t<t6). The positive current at Rsen2 will trigger the comparator U2 to go high. The output of U2 drives M4 to turn ON by the buffer Q7, and $V_A$ is higher than the output voltage. Power is delivered to the output instantaneously (t6<t<t7).

When the voltage $V_A$ drops below the output voltage level, reverse current starts to flow (t7<t<t8). The reverse voltage developed at Rsen2 will trigger the comparator U2 to flip over, latching buffer Q8. M4 is then OFF. M1 is still ON as $V_B$ is at a low state, but it stops power transferring to the output in this transition period (t8<t<t9). The reverse current flow discharges C2 of M2 in the path (M1, C2) and at the same time charges up C4 of M4 in the path (M1, C4, RL, Cout). In the process of rising to Vout, $V_B$ gradually reduces the negative threshold gate voltage of M1. Eventually M1 is OFF and Dm2 conducts. $V_B$ reaches the output voltage Vout (t9<t<t10). At this moment C1 of M1 is being charged in the path (Dm2, C1) and C3 of M3 is being discharged in the path (Dm2, RL, Cout, C3). $V_A$ further drops off. The low voltage of $V_A$ also drive M2 into saturation through the buffer Q4 (t10<t<t11). $V_A$ will reach the ground level and forward biasing the diode Dm3 of M3 in (t11<t<t12). The cycle repeats after t12.

Similar circuit performance can be achieved by putting the two CCSD MOSFETs in the upper half of the rectifier and the two VCSD MOSFETs in the lower half of the rectifier. It must be stressed that the two CCSD MOSFETs must be placed either in the upper half or lower half of the rectifier. It is also feasible that all the four switches in a rectifier are replaced by CCSD MOSFETs.

The above examples can be generalized by the following consideration of a full-bridge rectifier having four switches S1-S4 that may be diodes or active switches. The switches are disposed so that two switches S1 and S2 form an upper branch and two switches S3 and S4 form a lower branch. Schematically this may be illustrated as:

| S1 | S2 |
|----|----|
| S3 | S4 |

The two current loops are diagonals, ie one loop comprises switches S1 and S4, and the other current loop comprises switches S3 and S4. If the switches are chosen from voltage-controlled self-driven active switches, current-controlled self-driven active switches and diodes, the critical requirement is that in each current loop there must be either a current-controlled active switch or a diode. The following table illustrates all the possible embodiments of the invention and in which 0 indicates a voltage-controlled active switch, and 1 indicates a current-controlled active switch or a diode.

| S1 | S2 | S3 | S4 |
|----|----|----|----|
| 0 | 0 | 1 | 1 |
| 0 | 1 | 0 | 1 |
| 0 | 1 | 1 | 1 |
| 1 | 0 | 1 | 0 |
| 1 | 0 | 1 | 1 |
| 1 | 1 | 0 | 0 |
| 1 | 1 | 0 | 1 |
| 1 | 1 | 1 | 0 |
| 1 | 1 | 1 | 1 |

It will be seen from a review of the above that in each current loop (ie S1+S4 and S2+S3) there is provided either a current-controlled active switch or a diode that will automatically switch off when the switch current direction is reversed.

To illustrate the usefulness of the proposed circuit and principle, one application is given, in which the self-driven full-bridge SR is applied to inductively powered secondary assembly.

Figure 16:
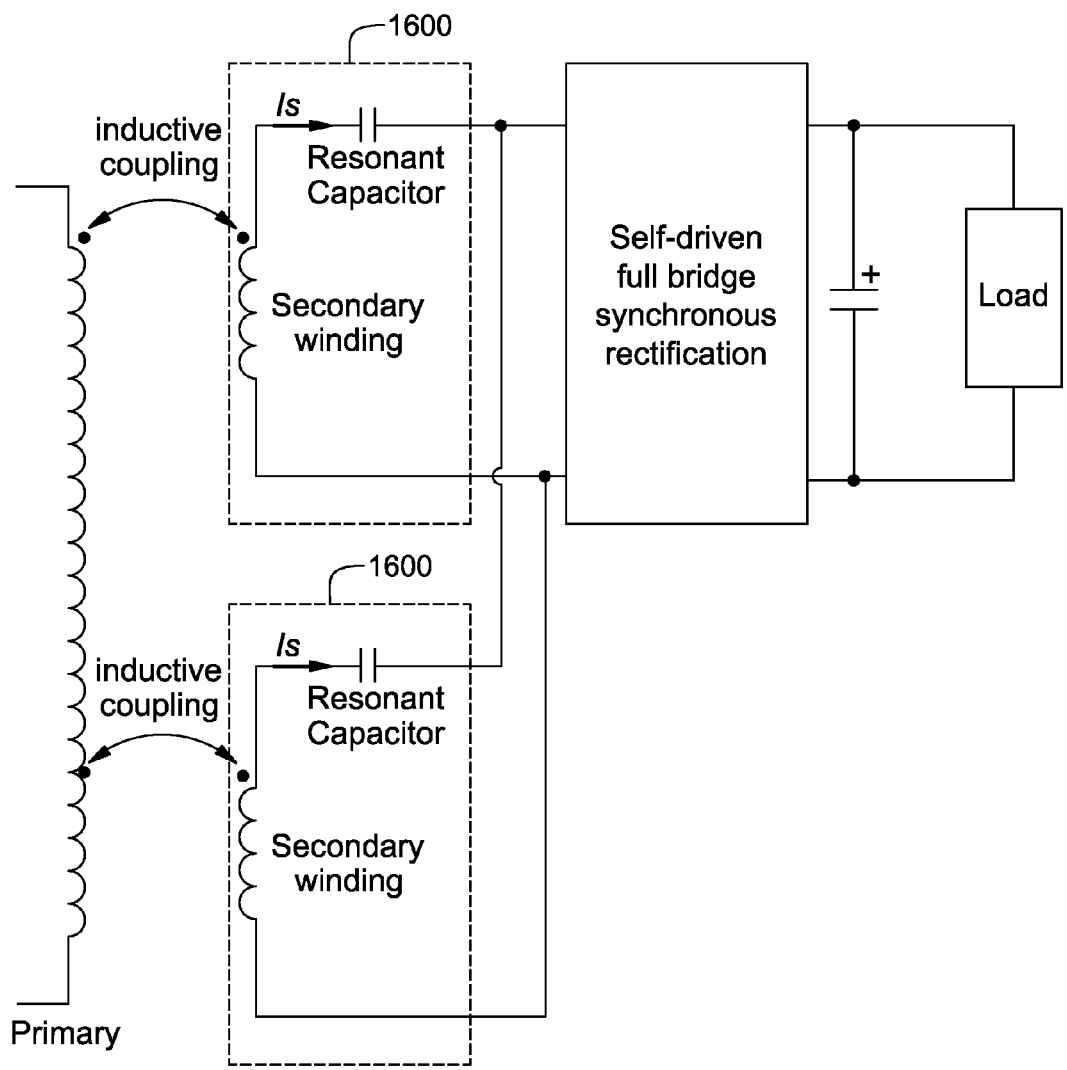
FIG. 16 is a block diagram of a secondary assembly incorporating an SR circuit according to an embodiment of the invention.

An embodiment of an inductively powered secondary assembly including a synchronous rectification circuit is shown in FIG. 16. The secondary winding receives AC energy inductively from the energy transmitter (the primary) when it is placed on or in proximity with the transmitter. The secondary winding, together with the resonant capacitor, forms a resonant tank which can be viewed as an AC current source. It must be noted that more than one winding together with their respect resonant capacitors can be used to form parallel AC current sources 1600 to improve output power. The current source(s) and the full-bridge synchronous rectification have the same operation modes as described in example 1 or example 2. The decreased power loss due to the use of synchronous rectification can improve the efficiency of the inductive power transfer. For example, if the current through the rectifier is 1A, the power loss due to the rectifier is reduced from 0.6-0.8W to less than 0.2W, because the internal resistance of each MOSFET is very low. Such saved loss is critical to the reduction of generated heat, especially when the secondary assembly is placed in any enclosed structure (e.g. in a mobile phone). The output of the secondary assembly can be used to power any DC load, like charging circuit for battery or for other energy storage component.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. An energy receiving circuit for use in an inductive power transfer system, comprising:
   a secondary winding;
   a capacitor coupled in series to said secondary winding to form a current-source or a voltage-source when placed in physical proximity to a primary winding, said current- or voltage-source being coupled between a first input node and second input node a first circuit element coupled between the first input node and a first output node;
   a second circuit element coupled between the second input node and the first output node;
   a third circuit element coupled between a second output node and the first input node, the second and third circuit elements forming a first group;
   a fourth circuit element coupled between the second output node and the second input node, the first and fourth circuit elements forming a second group;
   an output capacitor coupled between the first and second output nodes;
   a rectified output coupled in parallel with the output capacitor;
   wherein a plurality of the circuit elements, including one of the circuit elements from each of the groups, is a self-driven current-controlled active switch comprising a sensing resistor coupled between one of the input nodes and one of the output nodes; and
   wherein the other circuit element in each group is a voltage-controlled active switch.

2. A circuit as claimed in claim 1 wherein said active switches comprise power MOSFETs.

3. A circuit as claimed in claim 1 comprising more than one said current source coupled in parallel.

* * * * *